United States Patent
Usui et al.

(10) Patent No.: US 10,412,308 B2
(45) Date of Patent: Sep. 10, 2019

(54) DISPLAY CONTROLLER AND DISPLAY CONTROL METHOD

(71) Applicant: HONDA MOTOR CO., LTD., Tokyo (JP)

(72) Inventors: Kenta Usui, Kawasaki (JP); Yoshitaka Hiyama, Kawasaki (JP); Mutsuki Hirooka, Wako (JP); Yoshimasa Hayashida, Wako (JP); Masaaki Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 238 days.

(21) Appl. No.: 15/470,162

(22) Filed: Mar. 27, 2017

(65) Prior Publication Data
US 2017/0302855 A1    Oct. 19, 2017

(30) Foreign Application Priority Data

Apr. 19, 2016  (JP) ................ 2016-083635

(51) Int. Cl.
*H04N 5/232* (2006.01)
*G06T 7/70* (2017.01)
(Continued)

(52) U.S. Cl.
CPC ......... *H04N 5/23293* (2013.01); *B60K 37/02* (2013.01); *B60R 1/00* (2013.01);
(Continued)

(58) Field of Classification Search
CPC ...... H04N 7/18; H04N 5/23293; H04N 5/232; H04N 5/23203; B60R 1/00;
(Continued)

(56) References Cited

U.S. PATENT DOCUMENTS

2005/0083405 A1   4/2005   Imoto et al.
2005/0083427 A1   4/2005   Imoto
(Continued)

FOREIGN PATENT DOCUMENTS

JP     2005-20377 A      1/2005
JP     2005-110202 A     4/2005
(Continued)

OTHER PUBLICATIONS

Office Action dated Feb. 27, 2018, issued in counterpart Japanese Application No. 2016-083635, with English machine translation. (8 pages).

(Continued)

*Primary Examiner* — Tracy Y. Li
(74) *Attorney, Agent, or Firm* — Westerman, Hattori, Daniels & Adrian, LLP

(57) ABSTRACT

A display controller is provided that controls a camera capturing an image of an area diagonally behind a vehicle and including an imaging element that receives light from an image-capturing target through an optical system, the display controller including a processor that calculates a shift amount of a reference position of the imaging element with respect to an optical axis of the optical system, performs a control to move the reference position of the imaging element in a direction away from the optical axis according to the shift amount, and generates a display image based on the image captured by the camera so as to cause the display image to be displayed on a display device.

15 Claims, 25 Drawing Sheets

(51) Int. Cl.
*B60K 37/02* (2006.01)
*B60R 1/00* (2006.01)
*G06T 5/00* (2006.01)

(52) U.S. Cl.
CPC .................. *G06T 5/00* (2013.01); *G06T 7/70* (2017.01); *H04N 5/232* (2013.01); *H04N 5/23203* (2013.01); *B60K 2370/152* (2019.05); *B60K 2370/16* (2019.05); *B60K 2370/21* (2019.05); *B60K 2370/334* (2019.05); *B60K 2370/52* (2019.05); *B60K 2370/77* (2019.05); *B60R 2300/205* (2013.01); *B60R 2300/301* (2013.01); *B60R 2300/306* (2013.01); *B60R 2300/802* (2013.01); *B60R 2300/8046* (2013.01); *B60R 2300/8066* (2013.01)

(58) Field of Classification Search
CPC ........ B60R 2300/306; B60R 2300/802; B60R 2300/8066; B60R 2300/205; B60R 2300/8046; B60R 2300/301; G06K 9/00; B60K 37/02; B60K 2370/152; B60K 2370/334; B60K 2370/21; B60K 2370/52; B60K 2370/16; B60K 2370/77; G06T 5/00; G06T 7/70
See application file for complete search history.

(56) References Cited

U.S. PATENT DOCUMENTS

2008/0204557 A1* 8/2008 Kubota ..................... B60R 1/00
348/148
2017/0225609 A1* 8/2017 Tsuzuki ................ B60Q 1/143

FOREIGN PATENT DOCUMENTS

| JP | 2008-100554 A | 5/2008 |
| JP | 2008-275666 A | 11/2008 |
| JP | 2009-43003 A | 2/2009 |
| JP | 2010-228649 A | 10/2010 |
| JP | 2011-193485 A | 9/2011 |
| JP | 2012-156672 A | 8/2012 |

OTHER PUBLICATIONS

Office Action dated Feb. 19, 2019, issued in counterpart CN Application No. 201710202962.9, with English translation (17 pages).

* cited by examiner

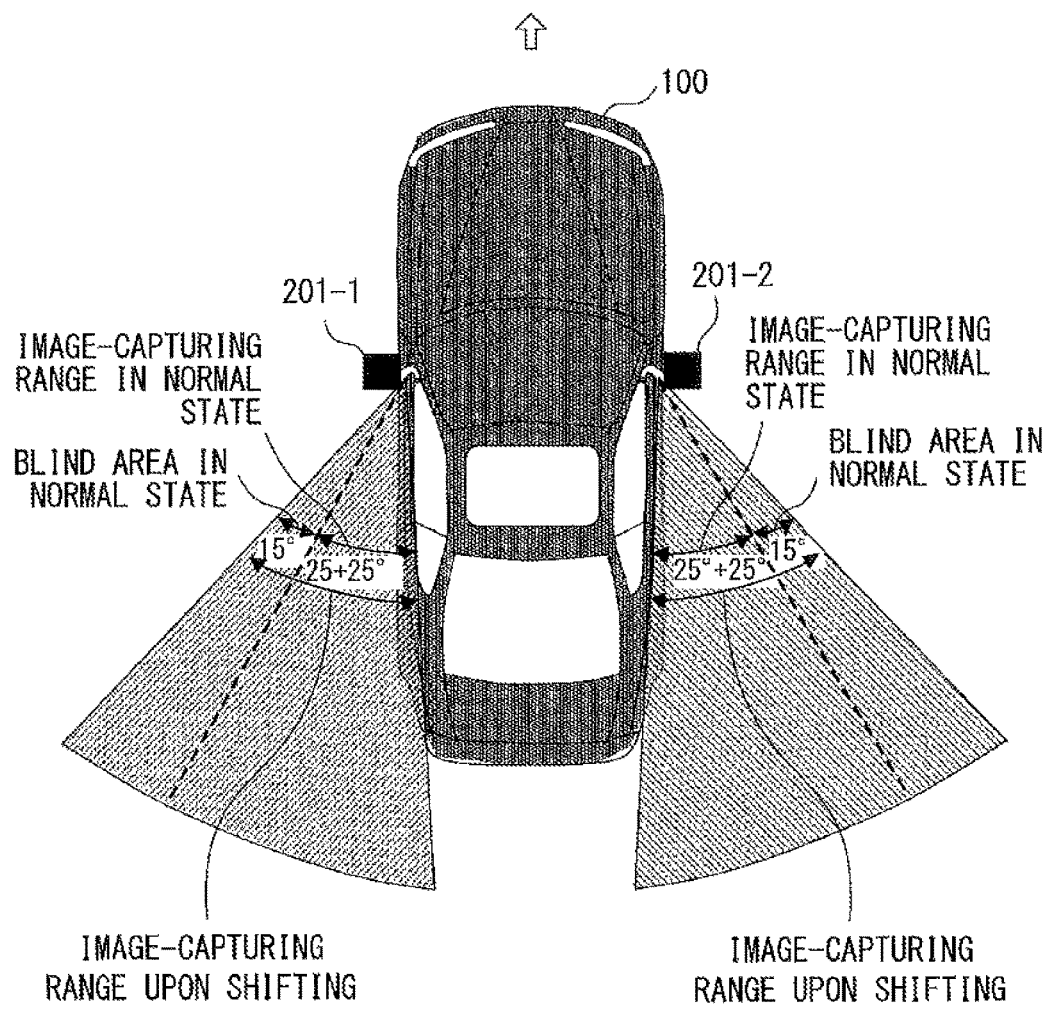
F I G. 2

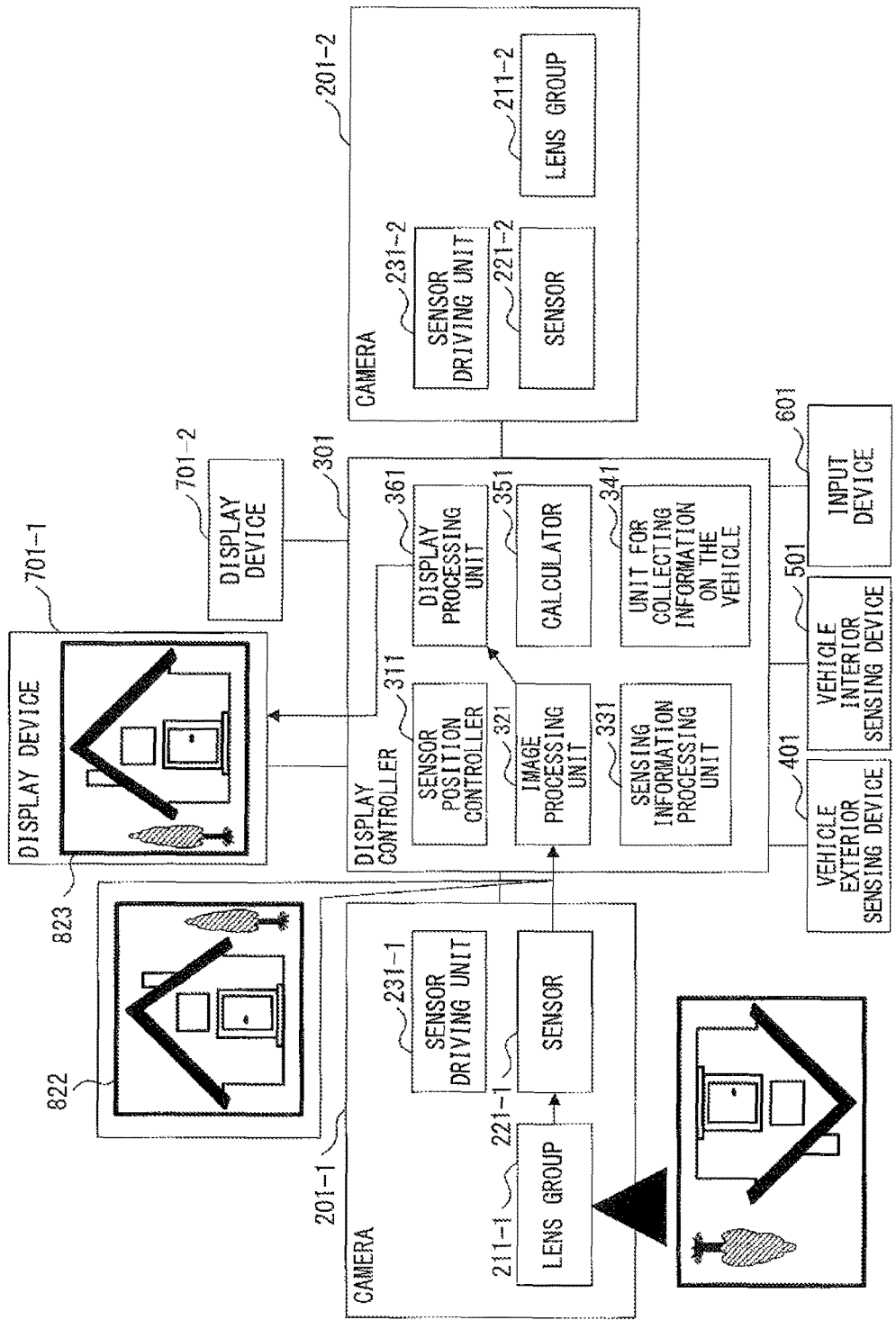
F I G. 17

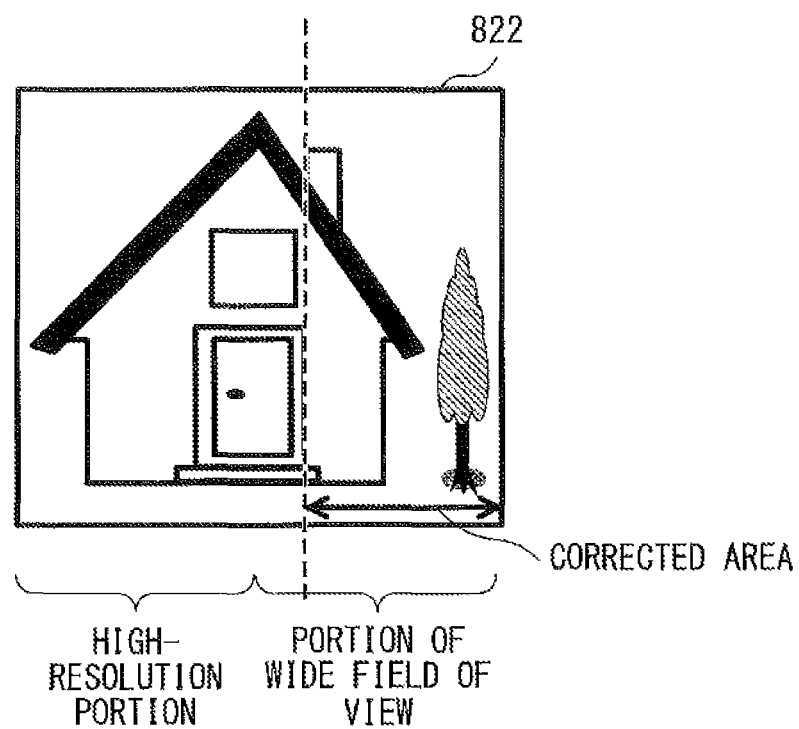
F I G. 23

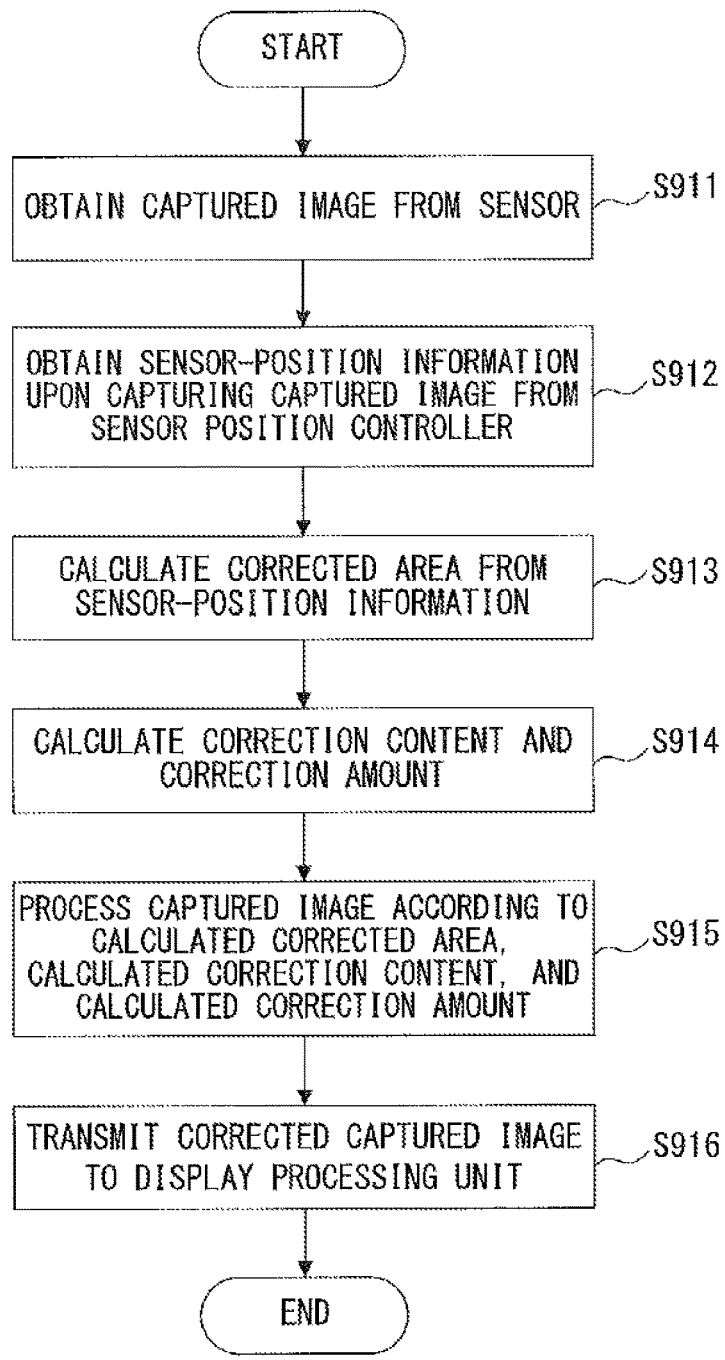
F I G. 2 4

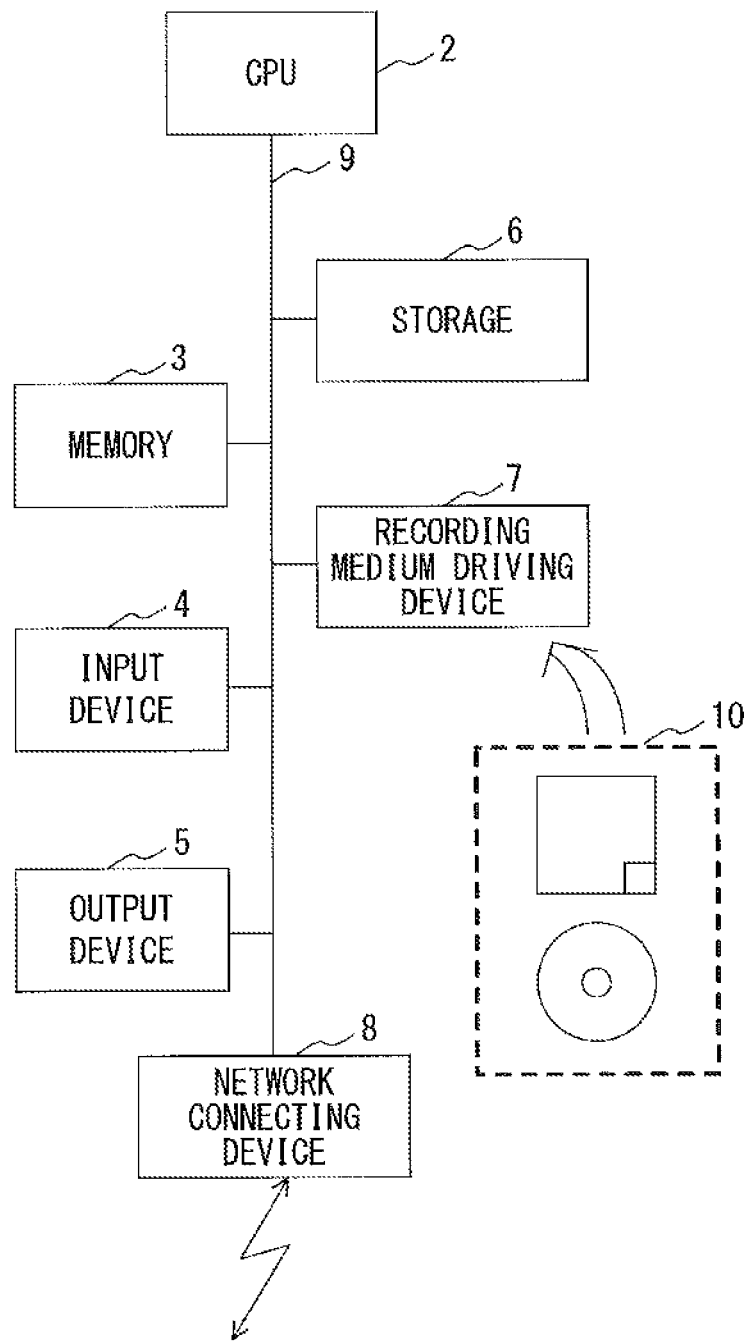
F I G. 2 5

DISPLAY CONTROLLER AND DISPLAY CONTROL METHOD

CROSS-REFERENCE TO RELATED APPLICATION

This application is based upon and claims the benefit of priority of the prior Japanese Patent Application No. 2016-083635, filed on Apr. 19, 2016, the entire contents of which are incorporated herein by reference.

FIELD

The embodiments discussed herein are related to a display controller and a display control method.

BACKGROUND

In general, a vehicle is provided with a door mirror mounted on its front seat door, the door mirror being used by a driver to look behind and diagonally behind. The door mirror protrudes from the vehicle body, so it may come into contact with a person in a narrow space. Thus, instead of a door mirror, an electronic door mirror constituted of a camera and a display has been provided in recent years.

A rearview device is known that includes a mirror member in which a mirror surface is formed, and an imaging device that images the mirror surface, the mirror surface being constituted of a flat portion and curved portions that extend right and left from the flat portion (see, for example, Patent Document 1).

The device described in Patent Document 1 uses a video of a reflected image created by the mirror member, so the size of the device will become large if a wide field of view is realized. A large-size device has a high resistance to air, so there is a problem in which fuel economy is decreased.

[Patent Document 1] Japanese Laid-open Patent Publication No. 2008-100554

SUMMARY

According to an aspect of the invention, a display controller controls a camera capturing an image of an area diagonally behind a vehicle and including an imaging element that receives light from an image-capturing target through an optical system.

The display controller includes a processor.

The processor calculates a shift amount of a reference position of the imaging element with respect to an optical axis of the optical system.

The processor performs a control to move the reference position of the imaging element in a direction away from the optical axis according to the shift amount.

The processor generates a display image based on the image captured by the camera so as to cause the display image to be displayed on a display device.

The object and advantages of the invention will be realized and attained by means of the elements and combinations particularly pointed out in the claims, It is to be understood that both the foregoing general description and the following detailed description are exemplary and explanatory and are not restrictive of the invention, as claimed.

BRIEF DESCRIPTION OF THE DRAWINGS

FIG. 2 illustrates an example of an installation of a camera in a vehicle;

FIG. 17 illustrates a flow of processing of displaying an image captured by the camera on the display device;

FIG. 23 illustrates a corrected area in a captured image;

FIG. 24 is a flowchart of the image processing according to the embodiments; and FIG. 25 illustrates a configuration of an information processing device (a computer).

DESCRIPTION OF EMBODIMENTS

Embodiments will now be described with reference to the drawings.

Figure 1:
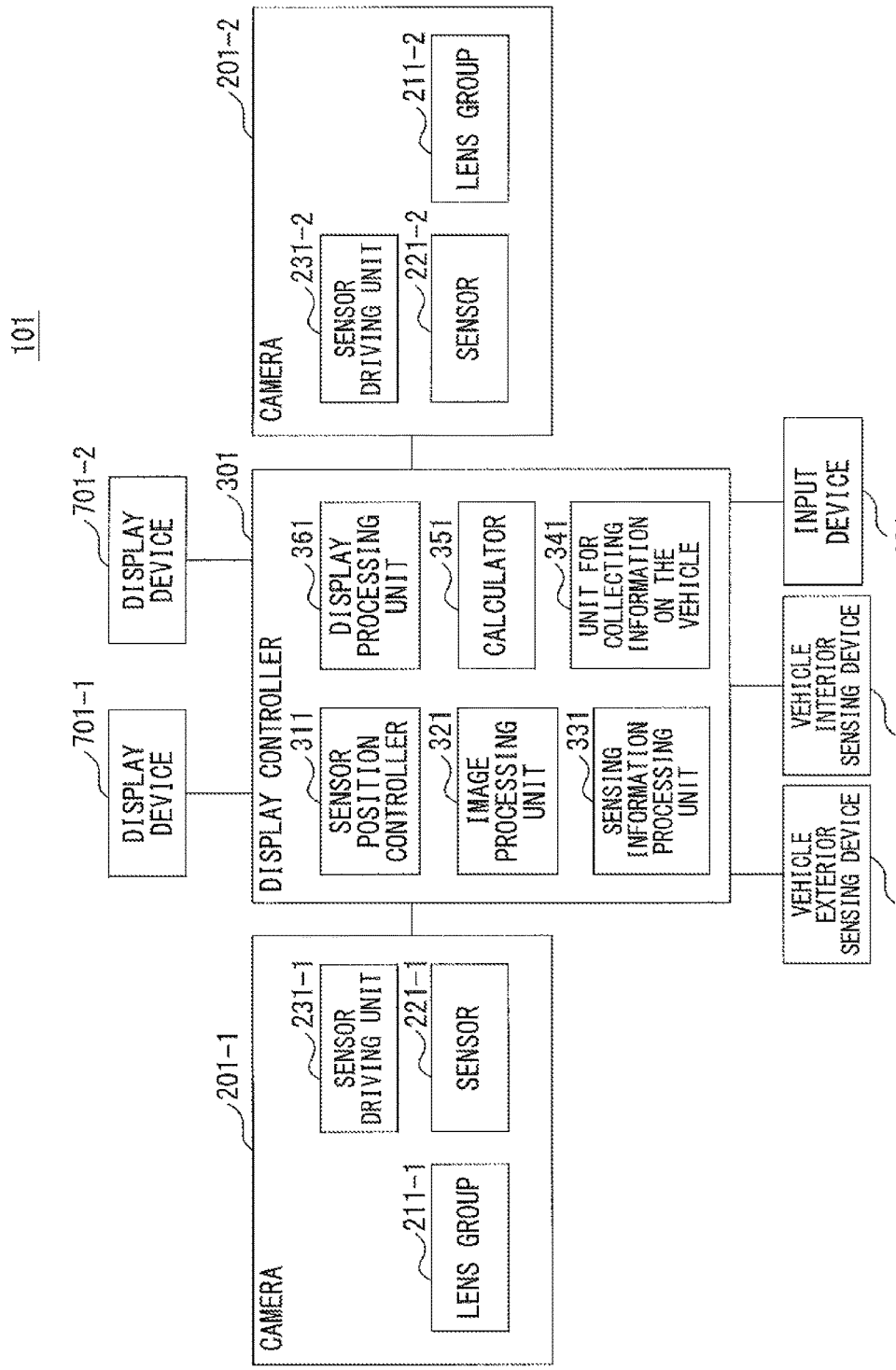
FIG. 1 illustrates a configuration of a system according to embodiments.

FIG. 1 illustrates a configuration of a system according to the embodiments.

A system 101 includes a camera 201-$i$ (i=1, 2), a display controller 301, a vehicle exterior sensing device 401, a vehicle interior sensing device 501, an input device 601, and a display device 701-$i$.

The system 101 is provided in, for example, a vehicle.

The camera 201-$i$ is mounted on a front seat door on the outside of a vehicle, and captures an image of an area behind and diagonally behind the vehicle. The image captured by the camera 201-$i$ (referred to as a captured image) is output to the display controller 301. The camera 201-$i$ is able to change an angle of view.

The camera 201-$i$ includes a lens group 211-$i$, a sensor 221-$i$, and a sensor driving unit 231-$i$.

The lens group 211-$i$ refracts light from a image-capturing target (a subject) so as to form an image on the sensor 211-$i$. The lens group 211-$i$ is configured, for example, by combining a plurality of lenses. Optical axes of the plurality of lenses included in the lens group 211-$i$ are coincident.

Further, an optical axis of the lens group 211-*i* is an optical axis when the lens group 211-*i* is considered a single lens. The lens group 211-*i* is an example of an optical system.

The sensor 221-*i* converts, into an electrical signal, light input through the lens group 221-*i*, and generates a captured image. The sensor 221-*i* is, for example, a charge coupled device (CCD) image sensor or a complementary metal oxide semiconductor (CMOS) image sensor. The sensor 221-*i* is an example of an imaging element.

The sensor driving unit 231-*i* is controlled by a sensor position controller 311 and moves a position of the sensor 221-*i*.

FIG. 2 illustrates an example of an installation of a camera in a vehicle.

FIG. 2 illustrates a vehicle (four-wheel vehicle) 100 provided with the camera 201-*i* as viewed from above. The arrow in FIG. 2 indicates a direction ahead of the vehicle 100.

A camera 201-1 is mounted on the outside of a left front seat door of the vehicle 100 (the outside of the vehicle), and a camera 201-2 is mounted on the outside of a right front seat door of the vehicle 100. The camera 201-1 captures an image of an area behind and diagonally behind the left side of the vehicle 100, and the camera 201-2 captures an image of an area behind and diagonally behind the right side of the vehicle 100.

In the embodiments, the angle of view of the camera 201-1 is 50 degrees in total in a normal state, 25 degrees on the left side and 25 degrees on the right side about the optical axis. In the camera 201-1, it is possible to increase the angle of view on the right side of an image-capturing direction of the camera 201-1 (it is the left side if the reference is the vehicle 100) by moving (shifting) the sensor 221-1. For example, the angle of view on the right side of an image-capturing direction of the camera 201-1 upon moving (shifting) the sensor 221-1 is increased by 15 degrees from the normal state, with the result that the angle of view of the camera 201-1 becomes 65 degrees. The increased value of the angle of view is just an example, and it may be greater than or less than 15 degrees.

Figure 3:
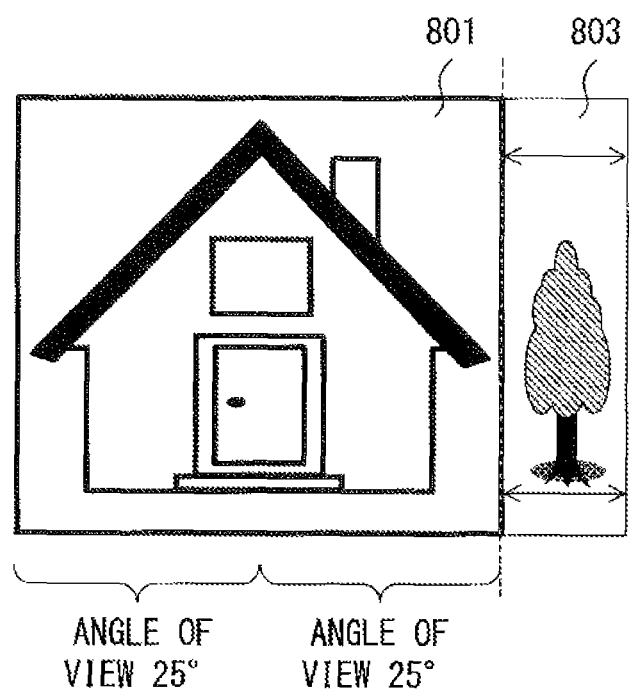
FIG. 3 illustrates a captured image and a blind area in a normal state.

FIG. 3 illustrates a captured image and a blind area in the normal state.

Figure 4:
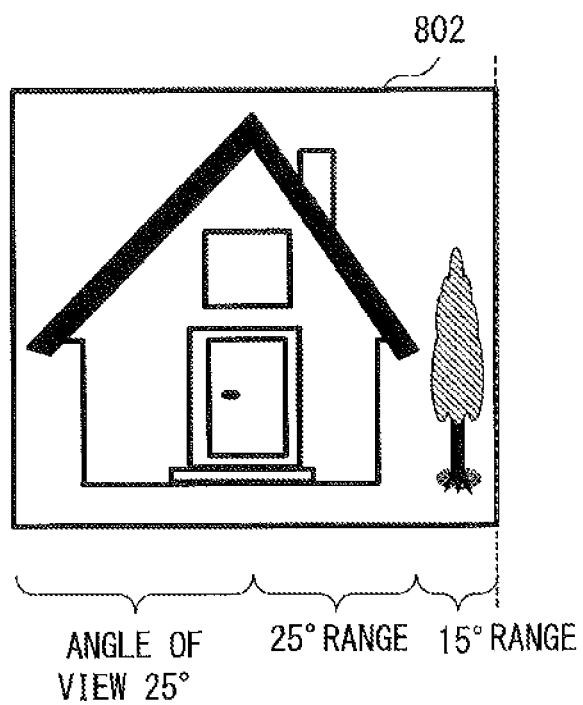
FIG. 4 illustrates a captured image upon shifting.

FIG. 4 illustrates a captured image upon shifting.

For example, in a normal state, a captured image 801 illustrated in FIG. 3 is captured by the camera 201-1 and a captured image 802 illustrated in FIG. 4 is captured by the camera 201-1 upon shifting.

A house that is included in a range of an angle of view of 50 degrees appears in the captured image 801 in the normal state. However, a tree that exists in a blind area 803 situated on the right side of an image-capturing range of the camera 201-1 in the normal state does not appear in the captured image 801.

On the other hand, upon shifting, the angle of view on the right side of the image-capturing direction of the camera 201-1 is increased, and an image of the blind area that is not captured in the normal state is also captured, with the result that the tree that exists in the blind area in the normal state appears in the captured image 802 in addition to the house appearing in the captured image 801. In the captured image 802, a range of an angle of view of 25 degrees appears on its left side, and ranges of an angle of view of 25 degrees and of an angle of view of 15 degrees appear on its right side.

As described above, the camera 201-1 is also able to capture, upon shifting, an image of a blind area that the camera 201-1 is not able to capture in the normal state.

Likewise, in the camera 201-2, it is possible to increase the angle of view on the left side of an image-capturing direction of the camera 201-2 (it is the right side if the reference is the vehicle 100) by moving the sensor 221-2. Accordingly, the camera 201-2 is also able to capture, upon shifting, an image of a blind area that the camera 201-2 is not able to capture in the normal state.

The description is continued returning to FIG. 1.

The display controller 301 controls the camera 201-*i* on the basis of inputs from the vehicle exterior sensing device 401, the vehicle interior sensing device 501, and the input device 601. The display controller 301 controls a position of the sensor 221-*i*, and causes a display image of wide field of view to be displayed on the display device 701-*i*.

The display controller 301 includes a sensor position controller 311, an image processing unit 321, a sensing information processing unit 331, a unit 341 for collecting information on the vehicle, a calculator 351, and a display processing unit 361. The display controller 301 is realized by, for example, an electronic control unit (ECU). Further, Each of the sensor position controller 311, the image processing unit 321, the sensing information processing unit 331, the unit 341 for collecting information on the vehicle, the calculator 351, and the display processing unit 361 may be realized by an ECU and connected to one another through a network.

The sensor position controller 311 outputs a control signal that controls the sensor driving unit 231-*i* on the basis of a shift amount received from the calculator 351, and moves the sensor 221-*i*. According to the shift amount, the sensor position controller 311 performs a control to move a reference position of the sensor 221-*i* in a direction away from the optical axis of the lens group 211-*i*.

The image processing unit 321 performs image processing, such as correction processing, on a captured image captured by the camera 201-*i*.

The sensing information processing unit 331 receives, from the vehicle exterior sensing device 401 and the vehicle interior sensing device 501, pieces of information that have been respectively detected by the vehicle exterior sensing device 401 and the vehicle interior sensing device 501, calculates information that can be used in the calculator 351 from the received pieces of information, and outputs it to the calculator 351.

The unit 341 for collecting information on the vehicle collects information on the vehicle from an electronic control unit (ECU) (not illustrated) or a sensor mounted on the vehicle (not illustrated). The information on the vehicle is, for example, a velocity, a steering angle, an angle of an accelerator pedal, or an angle of a brake pedal of the vehicle.

The calculator 351 receives pieces of information from the sensing information processing unit 331, the unit 341 for collecting information on the vehicle, and the input device 601, calculates a shift amount of the sensor 221-1 on the basis of the received pieces of information, and outputs the shift amount to the sensor position controller 311.

The display processing unit 361 controls the display device 701-*i*. The display processing unit 361 generates an image (referred to as a display image) obtained by left-right reversing a captured image captured by the camera 201-1, outputs the display image to the display device 701-1, and causes the display image to be displayed on the display device 701-1. The display processing unit 361 generates a display image obtained by left-right reversing a captured image captured by the camera 201-2, outputs the display image to the display device 701-2, and causes the display image to be displayed on the display device 701-2.

The vehicle exterior sensing device 401 is a sensor that detects a state of the outside of a vehicle such as the presence or absence of a person situated near the vehicle. The vehicle exterior sensing device 401 is, for example, a sonar, a radar, or a camera.

The vehicle interior sensing device 501 is a sensor that detects a state of the inside of the vehicle such as a state of a driver (for example, a direction of driver's eyes). The vehicle interior sensing device 501 is, for example, a line-of-sight sensor that detects the direction of driver's eyes, a camera, or an infrared sensor.

An instruction or information from a driver is input to the input device 601. The input device 601 is, for example, a navigation device, or a variable knob or a switch mounted on an instrument panel of a vehicle.

The display device 701-*i* displays an image that is captured by the camera 201-*i* and processed by the display controller 301. The display device 701-*i* is, for example, a liquid crystal display.

Figure 5:
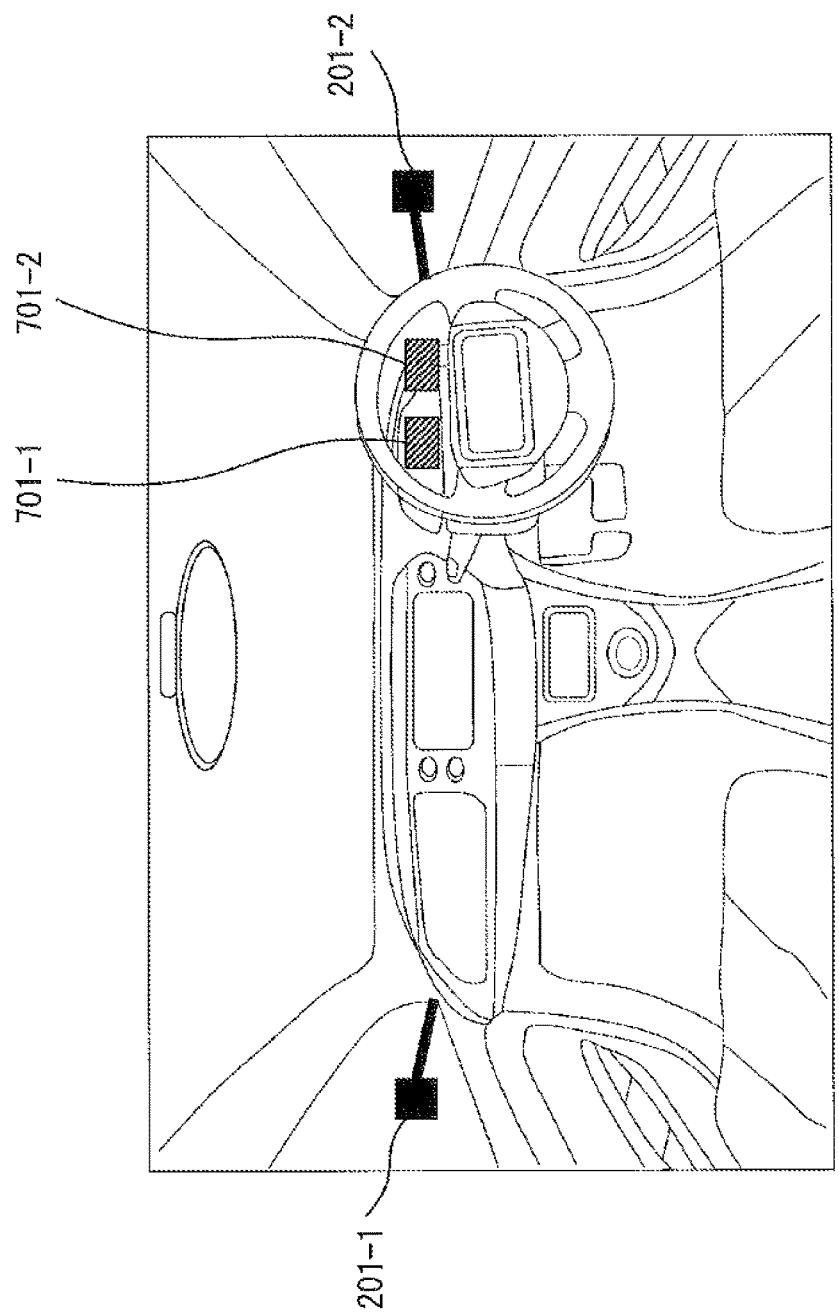
FIG. 5 illustrates an example of an installation of a display device as viewed from the inside of a vehicle.

FIG. 5 illustrates an example of an installation of a display device as viewed from the inside of a vehicle.

The display device 701-*i* is installed in a position in the field of view of a driver. Further, the display device 701-*i* is installed such that an image of an area behind and diagonally behind the left side of the vehicle is displayed on the left side of the driver (driver's seat) and an image of an area behind and diagonally behind the right side of the vehicle is displayed on the right side of the driver (driver's seat), as viewed from the driver (driver's seat). In FIG. 5, the display device 701-1 is installed on the left side of the front of the driver (driver's seat) and the display device 701-2 is installed on the right side of the front of the driver (driver's seat), as viewed from the driver (driver's seat). Further, in FIG. 5, the display devices 701-1 and 701-2 are arranged side by side in a position slightly higher than the center of a steering wheel.

An image of an area behind and diagonally behind the left side of the vehicle is displayed on the display device 701-1, and an image of an area behind and diagonally behind the right side of the vehicle is displayed on the display device 701-2. Specifically, the display device 701-1 displays an image obtained by left-right reversing a captured image captured by the camera 201-1, and the display device 701-2 displays an image obtained by left-right reversing a captured image captured by the camera 201-2. The reason that the image obtained by left-right reversing a captured image captured by the camera 201-*i* is displayed on the display device 701-*i* is to obtain an arrangement similar to the arrangement which the driver views using a usual optical mirror. The image displayed on the display device 701-*i* is referred to as a display image.

Further, the display device 701-*i* may be arranged in a meter panel or in a position higher than the position of the steering wheel. Furthermore, an image may be projected onto a windshield so as to be displayed, using a projector as the display device 701-*i*.

Next, a structure of the camera 201-1 and a captured image that corresponds to a position of the sensor 221-1 are described.

Figure 6:
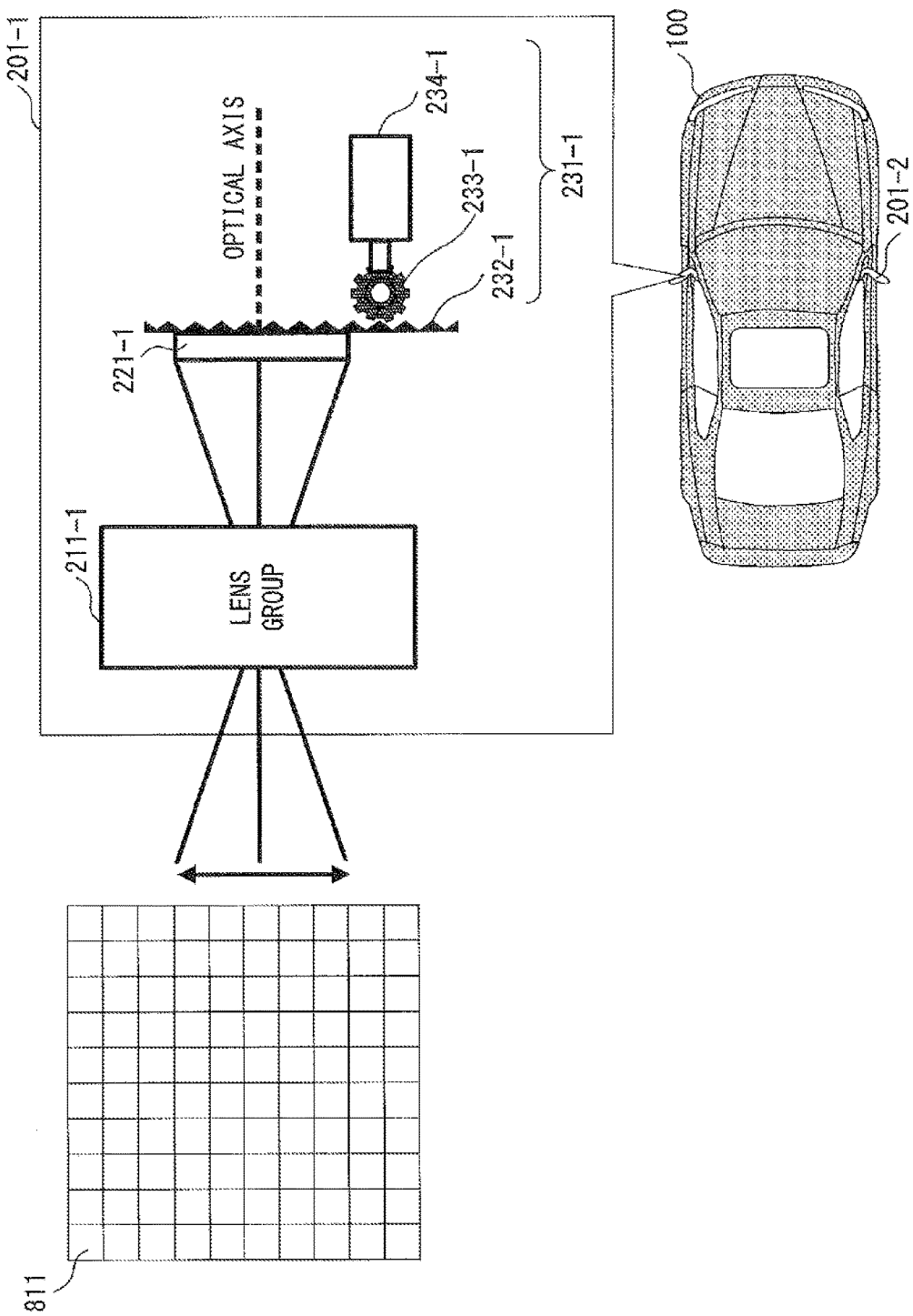
FIG. 6 illustrates a position of a sensor in the normal state.

FIG. 6 illustrates a position of the sensor in the normal state.

As in the case of FIG. 2, FIG. 6 illustrates the camera 201-1 mounted on the vehicle 100 as viewed from above.

An imaging surface of the sensor 221-1 is arranged perpendicularly to the optical axis of the lens group 211-1 and the ground.

In the embodiments, the state in which the reference position of the sensor 221-1 is situated on the optical axis of the lens group 211-1 is referred to as a normal state. The state in which the reference position of the sensor 221-1 is not situated on the optical axis of the lens group 211-1 is referred to as upon shifting. In the embodiments, the reference position is, for example, the center of the sensor 221-1. When the sensor 221-1 has, for example, a rectangular shape, the center of the sensor 221-1 is a point of intersection between a line connecting the midpoints of its two long sides and a line connecting the midpoints of its two short sides.

In the camera 201-1 of FIG. 6, a sensor driving unit 231-1 includes a rack 232-1, a pinion gear 233-1, and a motor 234-1.

The rack 232-1 is a flat bar with teeth and is mounted on the back side of the sensor 221-1.

The pinion gear 233-1 meshes with the rack 232-1 and is rotated by the motor 234-1.

The motor 234-1 rotates the pinion gear 233-1, which moves the sensor 221-1 in a direction perpendicular to the optical axis of the lens group 211-1. The direction in which the sensor 221-1 moves is a direction horizontal to the ground.

The position of the sensor 221-1 is not limited to being controlled by machine control using, for example, the rack 232-1 or the pinion gear 233-1 described above, but it may be controlled by electronic control using, for example, a linear motor as the sensor driving unit 231-1.

Figure 7:
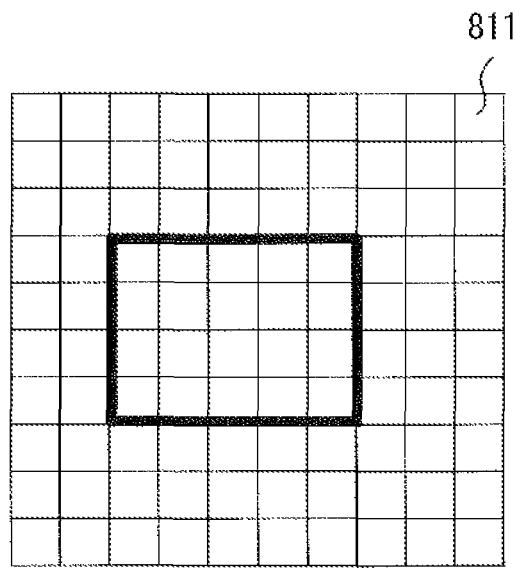
FIG. 7 illustrates an image-capturing range in the normal state.
Figure 8:
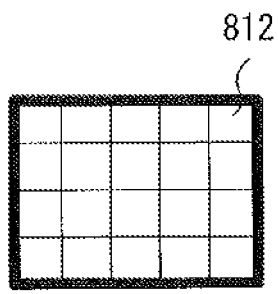
FIG. 8 illustrates a captured image in the normal state.

Here, the camera 201-1 captures an image of a test chart 811 with squares as an image-capturing target. The image-capturing range of the camera 201-1 in the normal state is an area surrounded by a thick line in the test chart 811 illustrated in FIG. 7, and a captured image 812 illustrated in FIG. 8 is captured. The surface of the test chart 811 on which the squares are situated is perpendicular to the optical axis of the lens group 211-1. Thus, FIG. 6 illustrates a state in which the test chart 811 is viewed from the image-capturing direction of the camera 201-1, not from above.

In FIG. 6, the lines that pass through the lens group 211-1 and connect the test chart 811 and the sensor 221-1 indicate positions at the sensor 221-1 each of which corresponds to a position of an image-capturing target, wherein an image of the image-capturing target is formed over a range of the positions at the sensor 221-1.

Next, the case of moving the sensor 221-1 is described.

Figure 9:
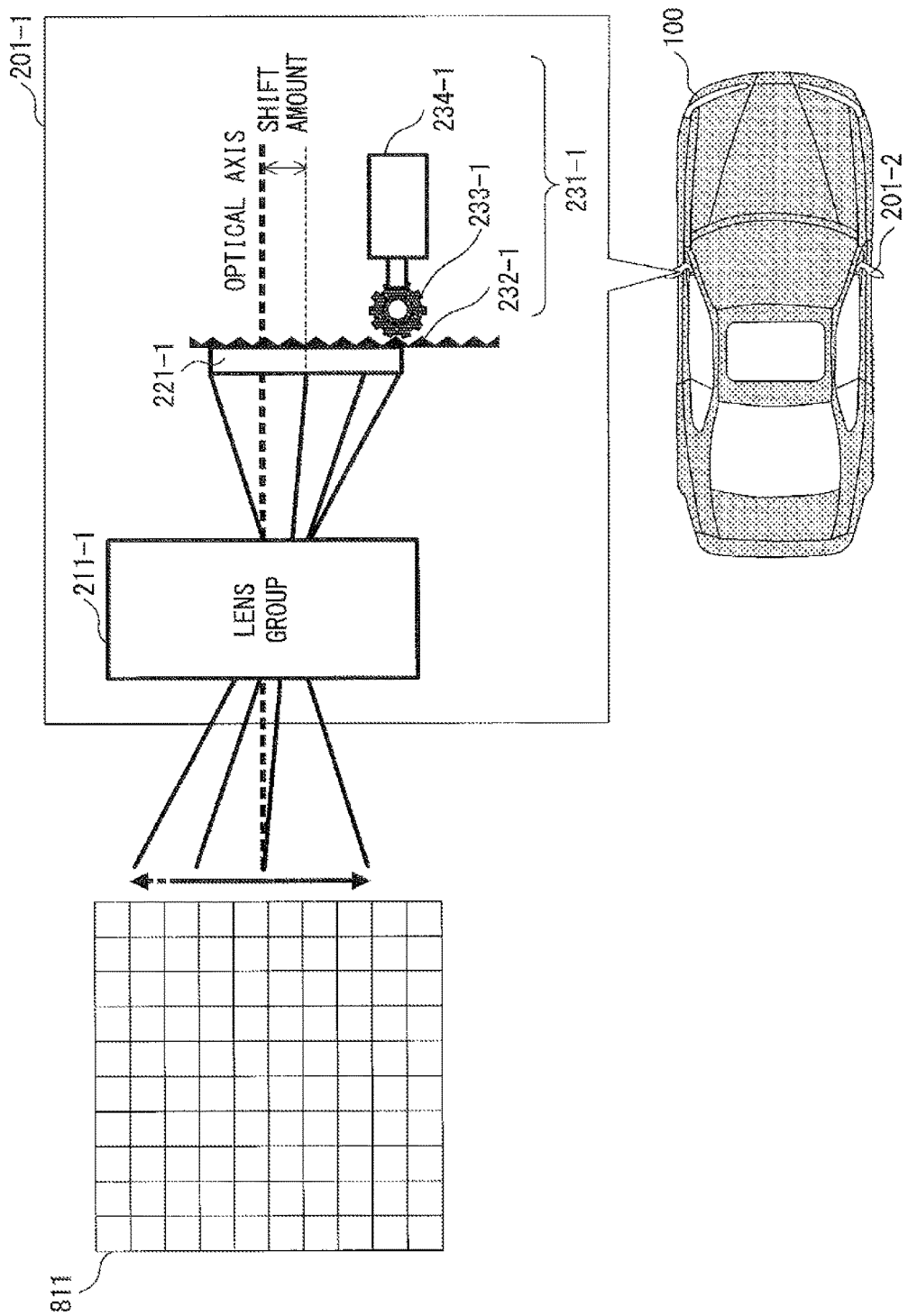
FIG. 9 illustrates a position of the sensor upon shifting.

FIG. 9 illustrates a position of the sensor upon shifting.

FIG. 9 illustrates the sensor 221-1 of FIG. 6 which has been moved. In FIG. 9, the sensor 221-1 has moved, by a shift amount, to a position closer to the vehicle 100 in a direction perpendicular to the optical axis of the lens group 211-1, compared to the case in the normal state. Further, the direction in which the sensor 221-1 moves is a direction horizontal to the ground. The difference between a position of the optical axis of the lens group 211-1 over the sensor 221-1 in the normal state (reference position) and a position of the optical axis of the lens group 211-1 over the sensor 221-1 upon shifting is referred to as a shift amount. The shift amount indicates a moving distance of the reference position of the sensor 221-1 with respect to the optical axis of the lens group 211-1. The sensor driving unit 231-1 moves the sensor 221-1 in a direction in which the reference position of the sensor 221-1 moves, by the shift amount, farther away from the optical axis of the lens group 211-1, compared to the case in the normal state.

The movement of the sensor 221-1 makes it possible to capture an image of an area that is not captured by the camera 201-1 in the normal state.

Figure 10:
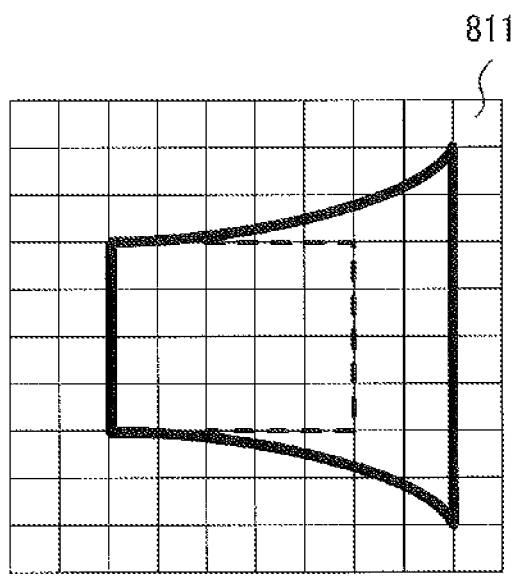
FIG. 10 illustrates an image-capturing range upon shifting.

When an image of the test chart 811 is captured as in the case of FIG. 6, the image-capturing range of the camera 201-1 upon shifting is an area surrounded by a thick line in the test chart 811 of FIG. 10 and is wider (has a wider field of view) than the image-capturing range in the normal state which is indicated by a dotted line. Specifically, the image-capturing range upon shifting has a wider portion on the right side from diagonally above to diagonally below than the image-capturing range in the normal state.

Figure 11:
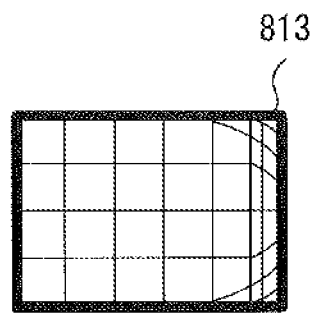
FIG. 11 illustrates a captured image upon shifting.

Upon shifting, a captured image 813 illustrated in FIG. 11 is captured, in which, on the right side of the captured image 813, the portion of the image-capturing range that is wider than a corresponding portion of the image-capturing range in the normal state appears in a compressed state.

Figure 12:
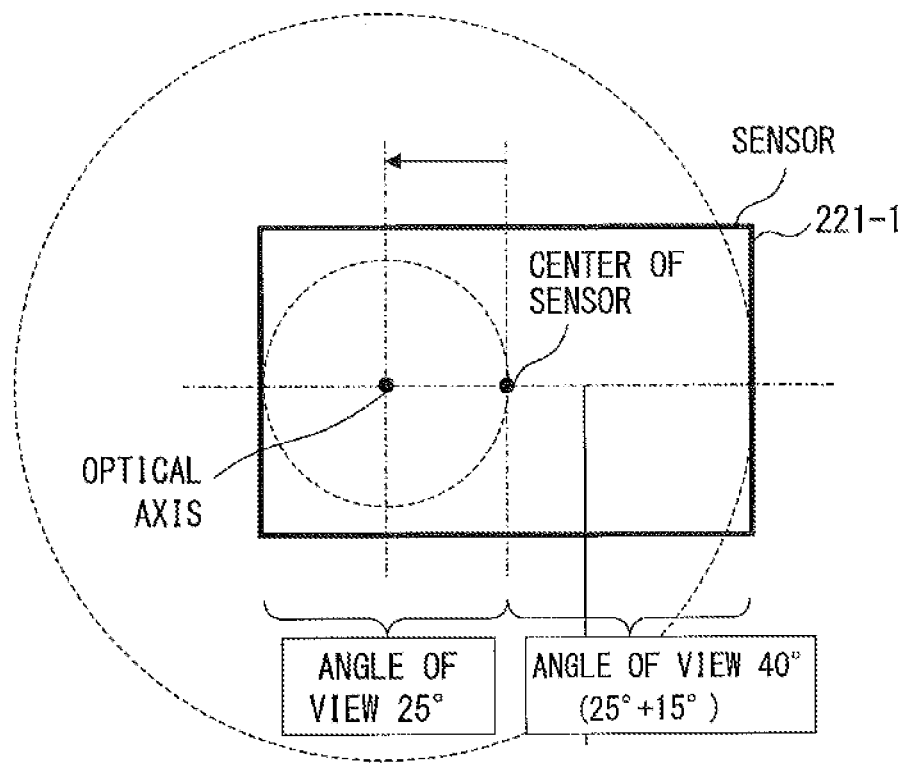
FIG. 12 illustrates a positional relationship between the sensor and an optical axis.

FIG. 12 illustrates a positional relationship between the sensor and the optical axis.

FIG. 12 illustrates the sensor 221-1 as viewed in a direction from the lens group 211-1 to the sensor 221-1 in FIG. 9.

In FIG. 12, the sensor 221-1 has a rectangular shape, and the center of the sensor 221-i is a point of intersection between a line connecting the midpoints of its two long sides and a line connecting the midpoints of its two short sides. It is assumed that the long sides of the sensor 221-1 (the top and bottom sides of the sensor 221-1 in FIG. 12) are horizontal to the ground and the short sides (the right and left sides of the sensor 221-1 in FIG. 12) are vertical to the ground. The horizontal direction is a direction parallel to the ground.

In the normal state in FIG. 6, the optical axis of the lens group 211-1 is situated in the center of the sensor 221-1. Upon shifting in FIG. 9, the optical axis of the lens group 211-1 is situated in a position to which it has moved to the left side in the horizontal direction from the center of the sensor 221-1 by ¼ of the length of the long side of the sensor 221-1. In other words, upon shifting, the sensor 221-1 moves to the right side in the horizontal direction by ¼ of the length of the long side of the sensor 221-1, as viewed in the direction from the lens group 211-1 to the sensor 221-1.

From among the two dotted circles about the optical axis in FIG. 12, an inner circle indicates a range of a 25-degree angle of view, and an outer circle indicates a range of a 105-degree angle of view. In the normal state, the angle of view of the camera 201-1 is 50 degrees as illustrated in FIG. 3, but upon shifting, it is possible to capture an image that includes the right edge in the range of a 105-degree angle of view about the optical axis and the left edge in the range of a 25-degree angle of view about the optical axis, using the right edge of sensor 221-1 and the left edge of sensor 221-1, respectively, as illustrated in FIG. 12. Thus, the captured image 802 as illustrated in FIG. 4 is obtained upon shifting, in which the range of a 25-degree angle of view appears on the left side and the range of an angle of view of 25 plus 15 degrees appears on the right side.

As described above, if the sensor 221-1 is moved to the right side in the horizontal direction when the direction from the lens group 211-1 to the sensor 221-1 is used as a reference (in other words, to the left side in the horizontal direction when the image-capturing direction of the camera 201-1 is used as a reference), the angle of view on the right side is increased, which results in being able to capture an image of a blind area on the right side of an image-capturing area in the normal state. Likewise, if the sensor 221-2 is moved to the left side in the horizontal direction when the direction from the lens group 211-2 to the sensor 221-2 is used as a reference (in other words, to the right side in the horizontal direction when the image-capturing direction of the camera 201-2 is used as a reference), the angle of view on the left side is increased, which results in being able to capture an image of a blind area on the left side of the image-capturing area in the normal state.

Next, each of the captured images in the normal state and upon shifting when an image of a landscape outside a vehicle is captured instead of the test chart 811 is described.

Figure 13:
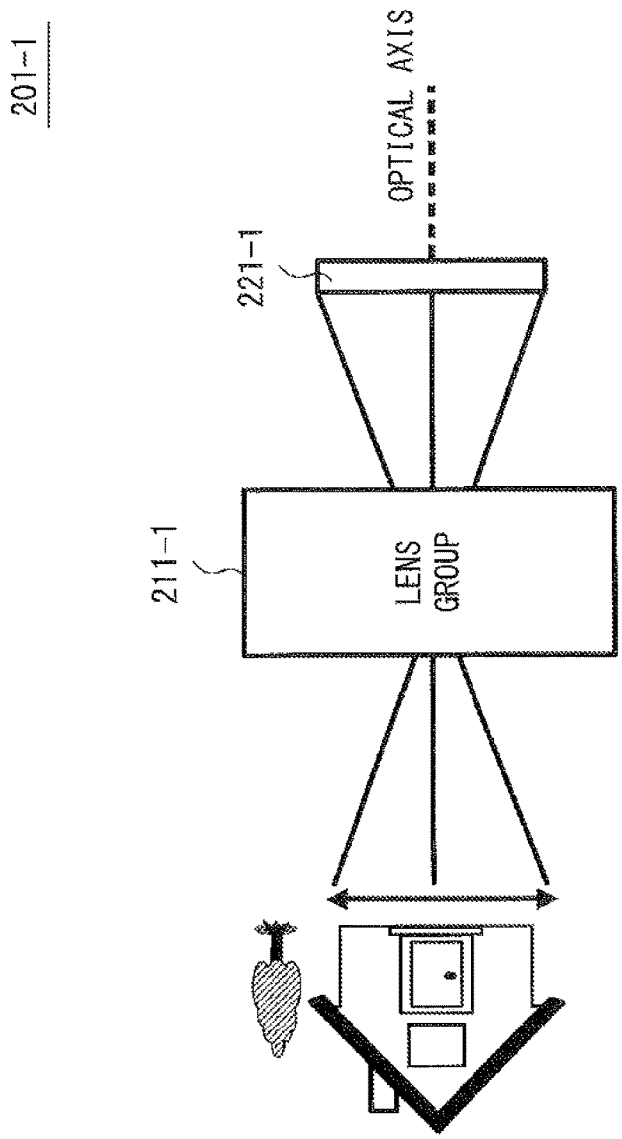
FIG. 13 illustrates a position of the sensor in the normal state.

FIG. 13 illustrates a position of the sensor in the normal state.

As in the case of FIG. 6, FIG. 13 illustrates the camera 201-1 mounted on the vehicle 100 as viewed from above. In FIG. 13, the descriptions of the vehicle 100 and the sensor driving unit 231-1 are omitted. In FIG. 13, there are a house and a tree diagonally behind the left side of the vehicle. The tree is situated on the left side of the house when the vehicle is used as a reference. In other words, the tree is situated on the right side of the house, as viewed from the camera 201-1.

Figure 14:
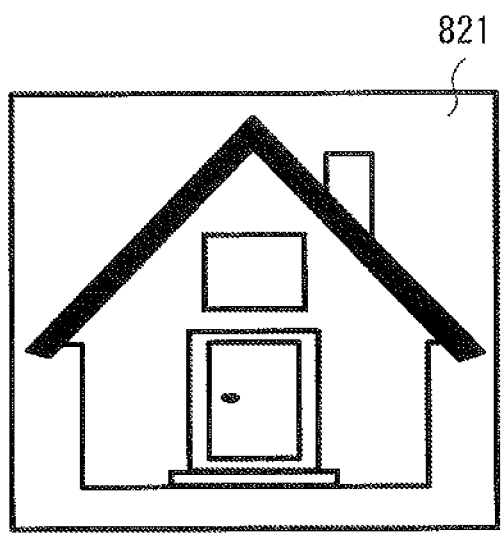
FIG. 14 illustrates a captured image in the normal state.

In the normal state, only the house is present in the image-capturing range of the camera 201-1, and the tree is present in the blind area. Thus, in the normal state, a captured image 821 illustrated in FIG. 14 is captured, and only the house appears in the captured image 821.

Figure 15:
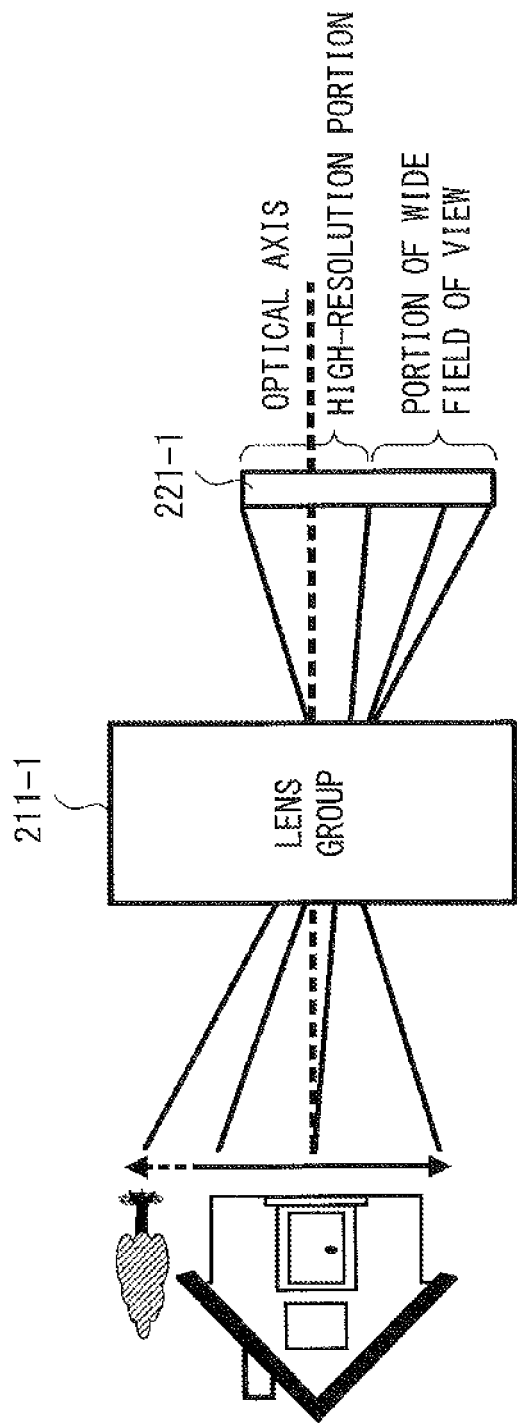
FIG. 15 illustrates a position of the sensor upon shifting.

FIG. 15 illustrates a position of the sensor upon shifting.

FIG. 15 illustrates the sensor 221-1 of FIG. 13 which has been moved. In FIG. 15, the sensor 221-1 has moved, by a shift amount calculated in the calculator 351, to a position closer to the vehicle 100 (to the right when the direction from the lens group 211-1 to the sensor 221-1 is used as a reference) in a direction perpendicular to the optical axis of the lens group 211-1, compared to the case in the normal state. Further, the direction in which the sensor 221-1 moves is a direction horizontal to the ground.

Figure 16:
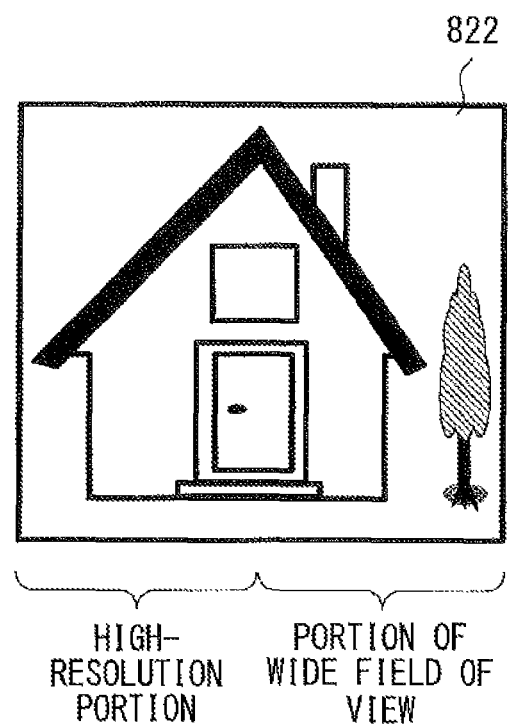
FIG. 16 illustrates a captured image upon shifting.

The angle of view on the right side in the image-capturing direction of the camera 201-1 is increased due to the movement of the sensor 221-1, which results in capturing an image of a blind area that is not captured in the normal state. Thus, a captured image 822 illustrated in FIG. 16 is captured, and the house and the tree appear in the captured image 822. A left portion of the captured image 822 is a high-resolution image because it is obtained by light passing around the center of the lens group 211-1, and is referred to as a high-resolution portion. A right portion of the captured image 822 is an area of a field of view wider than that in the normal state, and is referred to as a portion of a wide field of view, the area being obtained by use of a distortion in a peripheral portion of the lens group 211-1. The area of a wide field of view has a resolution lower than that of the high-resolution portion.

The captured image 822 in which the area behind and diagonally behind the vehicle 100 appears is left-right reversed, and the left-right reversed image (display image) is displayed on the display device 701-1 that is arranged on the left side of the middle of the body of a driver. Thus, when the display image is displayed on the display device 701-1, a portion of the display image that is close to the driver (a center portion) is a high-resolution portion, and a portion of the display image that is away from the driver (a peripheral portion) is a portion of a wide field of view.

FIG. 17 illustrates a flow of processing of displaying an image captured by the camera on the display device. In FIG. 17, the case of displaying an image captured by the camera 201-1 on the display device 701-1 is described.

Light from an image-capturing range is input to the sensor 221-1 via the lens group 211-1. The sensor 221-1 converts the input light into an electric signal so as to generate the captured image 822. The sensor 221-1 outputs the captured image 822 to the image processing unit 321.

The image processing unit 321 outputs the input captured image 822 to the display processing unit 361. The display processing unit 361 generates a display image 823 obtained by left-right reversing the input captured image 822 and outputs it to the display device 701-1. The display device 701-1 displays the input display image 823. The image processing unit 321 may perform correction processing on the input captured image 822 and output the corrected captured image to the display processing unit 361.

Processing of displaying an image captured by the camera 201-2 on the display device 701-2 is similar to the processing described above.

Figure 18:
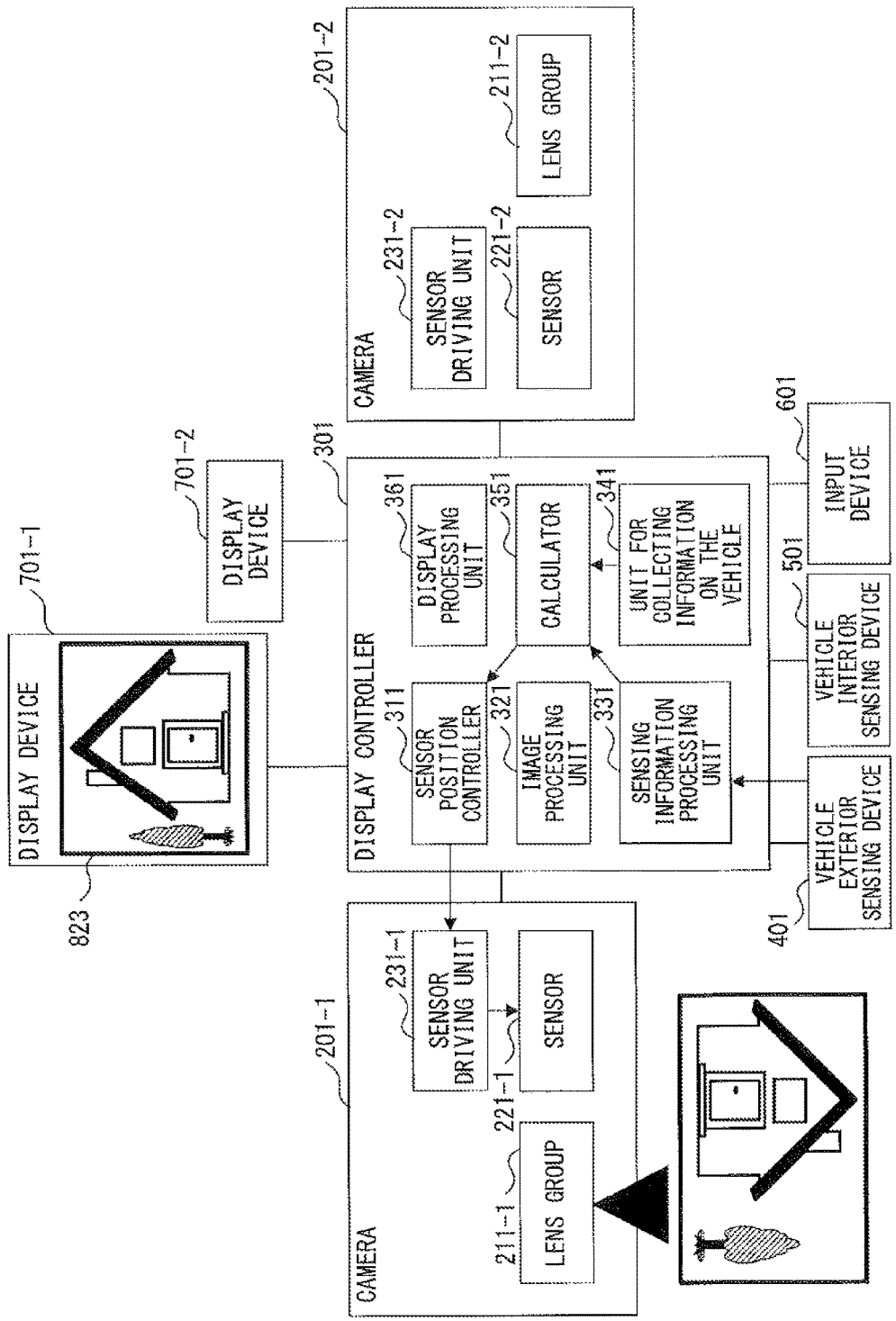
FIG. 18 illustrates a flow of processing of moving the sensor on the basis of a state outside a vehicle and a state of the vehicle.

FIG. 18 illustrates a flow of processing of moving the sensor on the basis of a state outside a vehicle and a state of the vehicle. In FIG. 18, the case of moving the sensor 221-1 is described.

The vehicle exterior sensing device 401 detects a state outside a vehicle and transmits information indicating a state outside the vehicle to the sensing information processing unit 331. The information indicating a state outside a vehicle is, for example, an image captured by a camera or a result of measurement performed by a sonar or a radar.

The sensing information processing unit 331 receives the detected information from the vehicle exterior sensing device 401, calculates, from the detected information, information that can be used in the calculator 351 (referred to as vehicle exterior sensing information), and transmits it to the calculator 351. The vehicle exterior sensing information is, for example, the presence or absence of a person or an obstacle situated near a vehicle, the number of people situated near the vehicle, or the distance from the vehicle to the person or the obstacle. For example, the sensing information processing unit 331 calculates the presence or absence of a person or an obstacle situated near a vehicle, the number of people situated near the vehicle, or the distance from the vehicle to the person or the obstacle, using an image captured by the camera or a result of measurement performed by a sonar or a radar.

The unit 341 for collecting information on the vehicle collects information on the vehicle from an ECU (not illustrated) or a sensor mounted on the vehicle (not illustrated). The information on the vehicle is, for example, a velocity, a steering angle, an angle of an accelerator pedal, or an angle of a brake pedal of the vehicle. The unit 341 for collecting information on the vehicle transmits the collected information on the vehicle to the calculator 351.

The calculator 351 calculates a shift amount of the sensor 221-$i$ on the basis of vehicle exterior sensing information and information on the vehicle. For example, the calculator 351 stores therein a table in which a shift amount of the sensor 221-1 is associated with vehicle exterior sensing information and information on the vehicle, and calculates the shift amount of the sensor 221-1 which corresponds to the pieces of information input to the calculator 351 by referring to the table. The calculator 351 transmits the calculated shift amount of the sensor 221-$i$ to the sensor position controller 311.

For example, when there are many people near the vehicle, the calculator 351 increases the shift amount of the sensor 221-1, which results in realizing an expansion of a range of a wide field of view.

The sensor position controller 311 receives the shift amount of the sensor 221-1, and transmits, to the sensor driving unit 231-1, a control signal that moves the sensor 221-1 to a position corresponding to the received shift amount. According to the received control signal, the sensor driving unit 231-1 moves the sensor 221-1 to the position corresponding to the shift amount calculated in the calculator 351.

Figure 19:
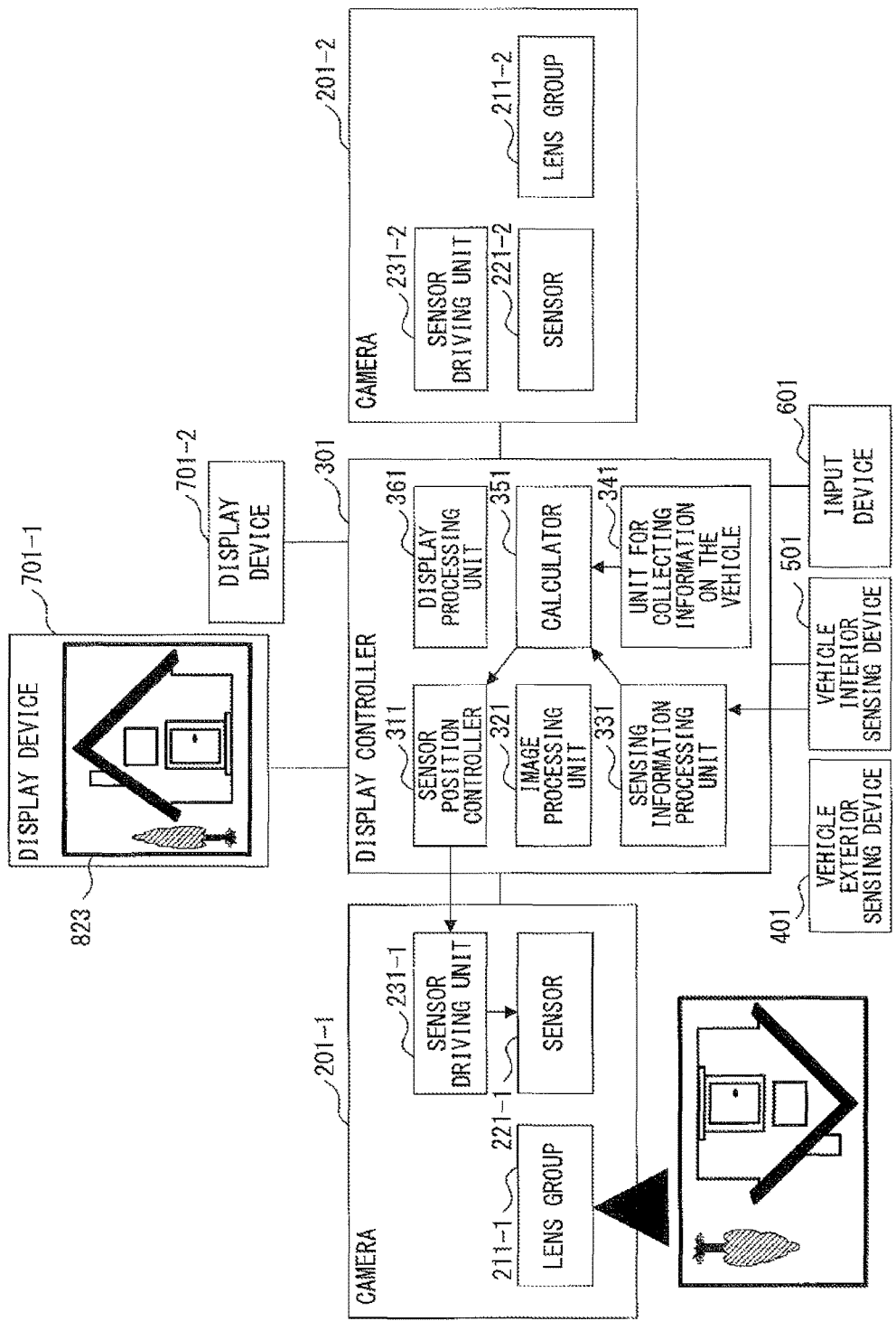
FIG. 19 illustrates a flow of processing of moving the sensor on the basis of a state inside a vehicle and a state of the vehicle.

FIG. 19 illustrates a flow of processing of moving the sensor on the basis of a state inside a vehicle and a state of the vehicle. In FIG. 19, the case of moving the sensor 221-1 is described.

The vehicle interior sensing device 501 detects a state inside a vehicle and transmits information indicating a state inside the vehicle to the sensing information processing unit 331. The information indicating a state inside a vehicle is, for example, a vector that indicates a direction of driver's eyes.

The sensing information processing unit 331 receives the information detected by the vehicle interior sensing device 501 from the vehicle interior sensing device 501, calculates, from the information detected by the vehicle interior sensing device 501, information that can be used in the calculator 351 (vehicle interior sensing information), and transmits it to the calculator 351. The vehicle interior sensing information is, for example, a direction of driver's eyes or a range of a line of sight.

The unit 341 for collecting information on the vehicle collects information on the vehicle from the ECU (not illustrated) or the sensor mounted on the vehicle (not illustrated). The information on the vehicle is, for example, a velocity, a steering angle, an angle of an accelerator pedal, or an angle of a brake pedal of the vehicle. The unit 341 for collecting information on the vehicle transmits the collected information on the vehicle to the calculator 351.

The calculator 351 calculates a shift amount of the sensor 221-$i$ on the basis of vehicle interior sensing information and information on the vehicle. For example, the calculator 351 stores therein a table in which a shift amount of the sensor 221-1 is associated with vehicle interior sensing information and information on the vehicle, and calculates the shift amount of the sensor 221-1 which corresponds to the pieces of information input to the calculator 351 by referring to the table. The calculator 351 transmits the calculated shift amount of the sensor 221-$i$ to the sensor position controller 311.

For example, when the driver is looking at a range of a wide field of view, the calculator 351 increases the shift amount of the sensor 221-1, which results in realizing an expansion of the range of ad of view.

The sensor position controller 311 receives the shift amount of the sensor 221-1, and transmits, to the sensor driving unit 231-1, a control signal that moves the sensor 221-1 to a position corresponding to the received shift amount. According to the received control signal, the sensor driving unit 231-1 moves the sensor 221-1 to the position corresponding to the shift amount calculated in the calculator 351.

Figure 20:
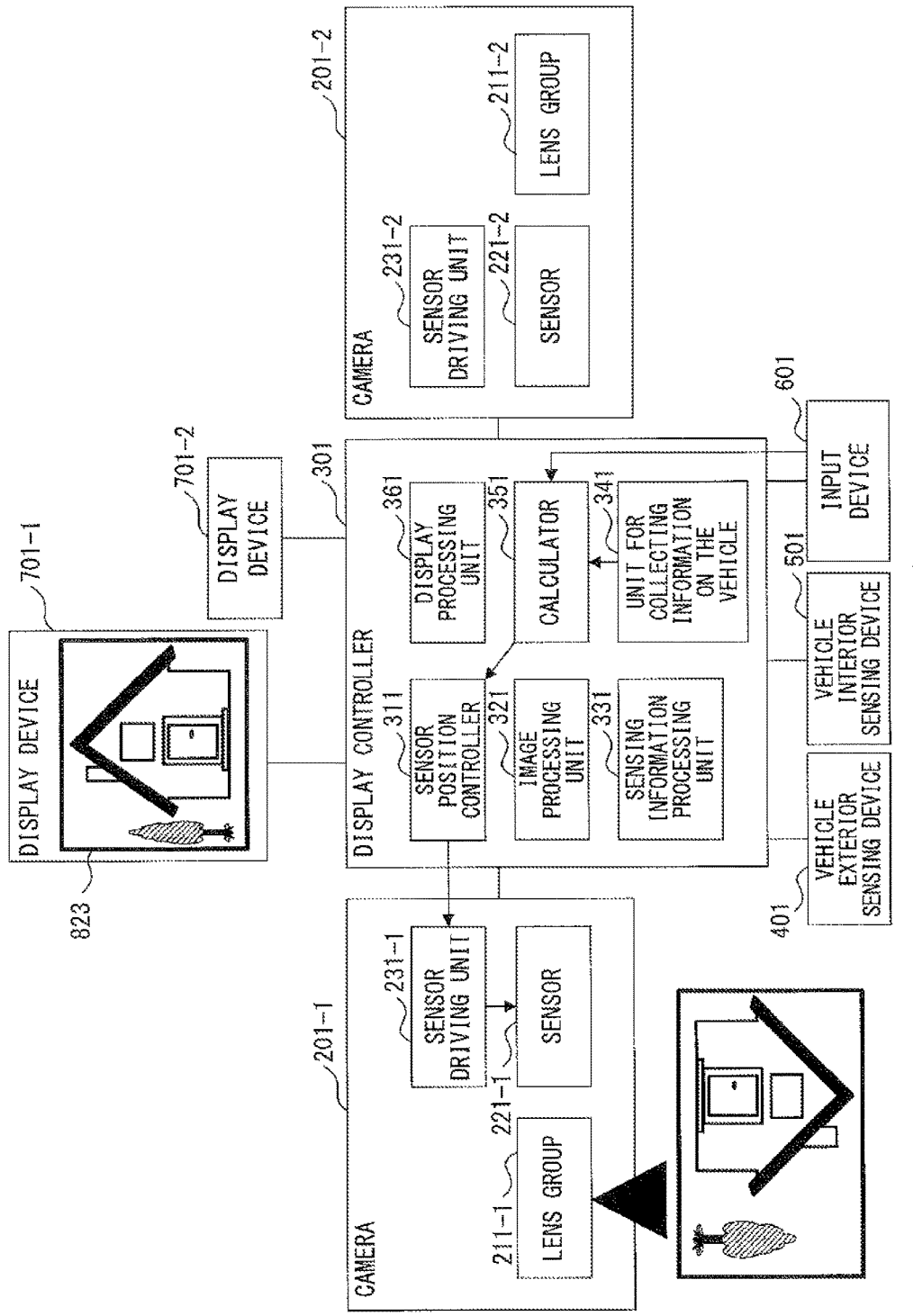
FIG. 20 illustrates a flow of processing of moving the sensor on the basis of an input from a driver.

FIG. 20 illustrates a flow of processing of moving the sensor on the basis of an input from a driver. In FIG. 20, the case of moving the sensor 221-1 is described.

The input device 601 transmits information input by the driver (referred to as input information) to the calculator 351. The input information is, for example, an instruction to switch between display images on the display device 701-$i$ in a normal state and in a state of a wide field of view, or an instruction to make the image-capturing range of the camera 201-$i$ wider or narrower.

The unit 341 for collecting information on the vehicle collects information on the vehicle from the ECU (not illustrated) or the sensor mounted on the vehicle (not illustrated). The information on the vehicle is, for example, a velocity, a steering angle, an angle of an accelerator pedal, or an angle of a brake pedal of the vehicle. The unit 341 for collecting information on the vehicle transmits the collected information on the vehicle to the calculator 351.

The calculator 351 calculates a shift amount of the sensor 221-*i* on the basis of input information and information on the vehicle. For example, the calculator 351 stores therein a table in which a shift amount of the sensor 221-1 is associated with input information and information on the vehicle, and calculates the shift amount of the sensor 221-1 which corresponds to the pieces of information input to the calculator 351 by referring to the table. The calculator 351 transmits the calculated shift amount of the sensor 221-*i* to the sensor position controller 311.

For example, when the input information indicates a switch to a wide field of view, the calculator 351 increases the shift amount of the sensor 221-1, which results in realizing an expansion of the range of a wide field of view.

The sensor position controller 311 receives the shift amount of the sensor 221-1, and transmits, to the sensor driving unit 231-1, a control signal that moves the sensor 221-1 to a position corresponding to the received shift amount. According to the received control signal, the sensor driving unit 231-1 moves the sensor 221-1 to the position corresponding to the shift amount calculated in the calculator 351.

The descriptions of the controls in FIGS. 18 to 20 are merely examples, and the shift amount of the sensor may be calculated using any combination of the pieces of information from the vehicle exterior sensing device 401, the vehicle interior sensing device 501, and the input device 601. The descriptions of the controls in FIGS. 18 to 20 can also be applied to the case of moving the sensor 221-2 of the camera 201-2.

Figure 21:
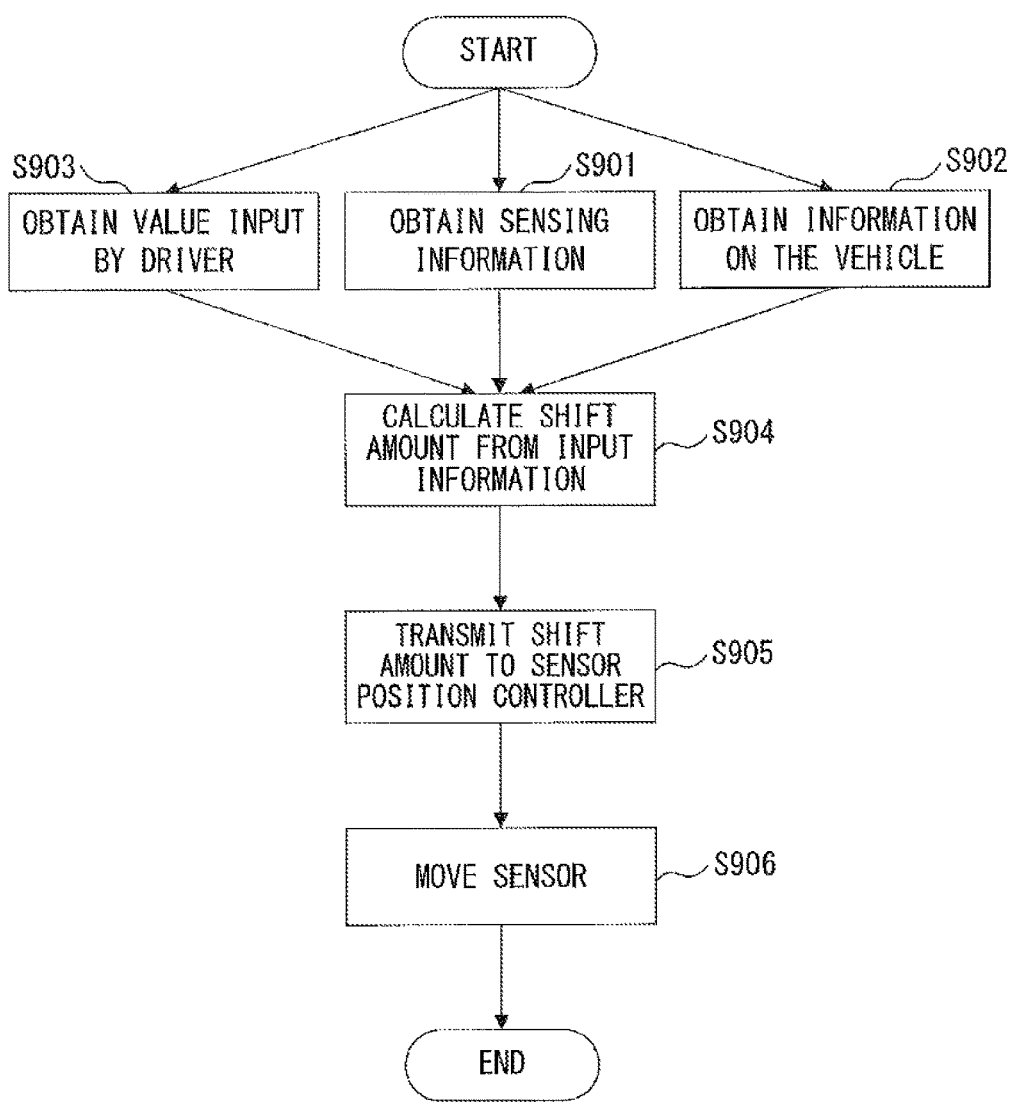
FIG. 21 is a flowchart of processing of moving the sensor according to the embodiments.

FIG. 21 is a flowchart of processing of moving the sensor according to the embodiments.

In Step S901, the sensing information processing unit 331 receives information detected by the vehicle exterior sensing device 401 from the vehicle exterior sensing device 401, calculates, from the detected information, information that can be used in the calculator 351 (referred to as vehicle exterior sensing information), and transmits it to the calculator 351. Further, the sensing information processing unit 331 receives the information detected by the vehicle interior sensing device 501 from the vehicle interior sensing device 501, calculates, from the information detected by the vehicle interior sensing device 501, information that can be used in the calculator 351 (referred to as vehicle interior sensing information), and transmits it to the calculator 351.

In Step S902, the unit 341 for collecting information on the vehicle collects information on the vehicle from the ECU (not illustrated) or the sensor mounted on the vehicle (not illustrated). The information on the vehicle is, for example, a velocity, a steering angle, an angle of an accelerator pedal, or an angle of a brake pedal of the vehicle. The unit 341 for collecting information on the vehicle transmits the collected information on the vehicle to the calculator 351.

In Step S903, the calculator 351 receives instructions or information input by a driver from the input device 601 as input information. When there are no inputs from the input device 601, the process of Step S903 may be omitted.

The processes of Steps S901 to S903 may be performed in parallel, independently from one another, or they may be performed in series in any order.

In Step S904, the calculator 351 calculates a shift amount of the sensor 221-*i* on the basis of vehicle exterior sensing information, vehicle interior sensing information, informa-tion on the vehicle, and input information. For example, the calculator 351 stores therein a table in which a shift amount of the sensor 221-*i* is associated with vehicle exterior sensing information, vehicle interior sensing information, information on the vehicle, and input information, and calculates the shift amount of the sensor 221-*i* which corresponds to the pieces of information input to the calculator 351 by referring to the table.

In Step S905, the calculator 351 transmits the calculated shift amount of the sensor 221-*i* to the sensor position controller 311.

In Step S906, the sensor position controller 311 receives the shift amount of the sensor 221-*i*, and transmits, to the sensor driving unit 231-*i*, a control signal that moves the sensor 221-*i* to a position corresponding to the received shift amount. According to the received control signal, the sensor driving unit 231-*i* moves the sensor 221-*i* to the position corresponding to the shift amount calculated in the calculator 351.

Next, image processing performed on a captured image is described. For example, there are a degradation in resolution, a distortion, a chromatic aberration, and the like in the portion of a wide field of view of the captured image 822 of FIG. 16. Thus, a clear image is generated for a driver by performing the image processing described below.

Figure 22:
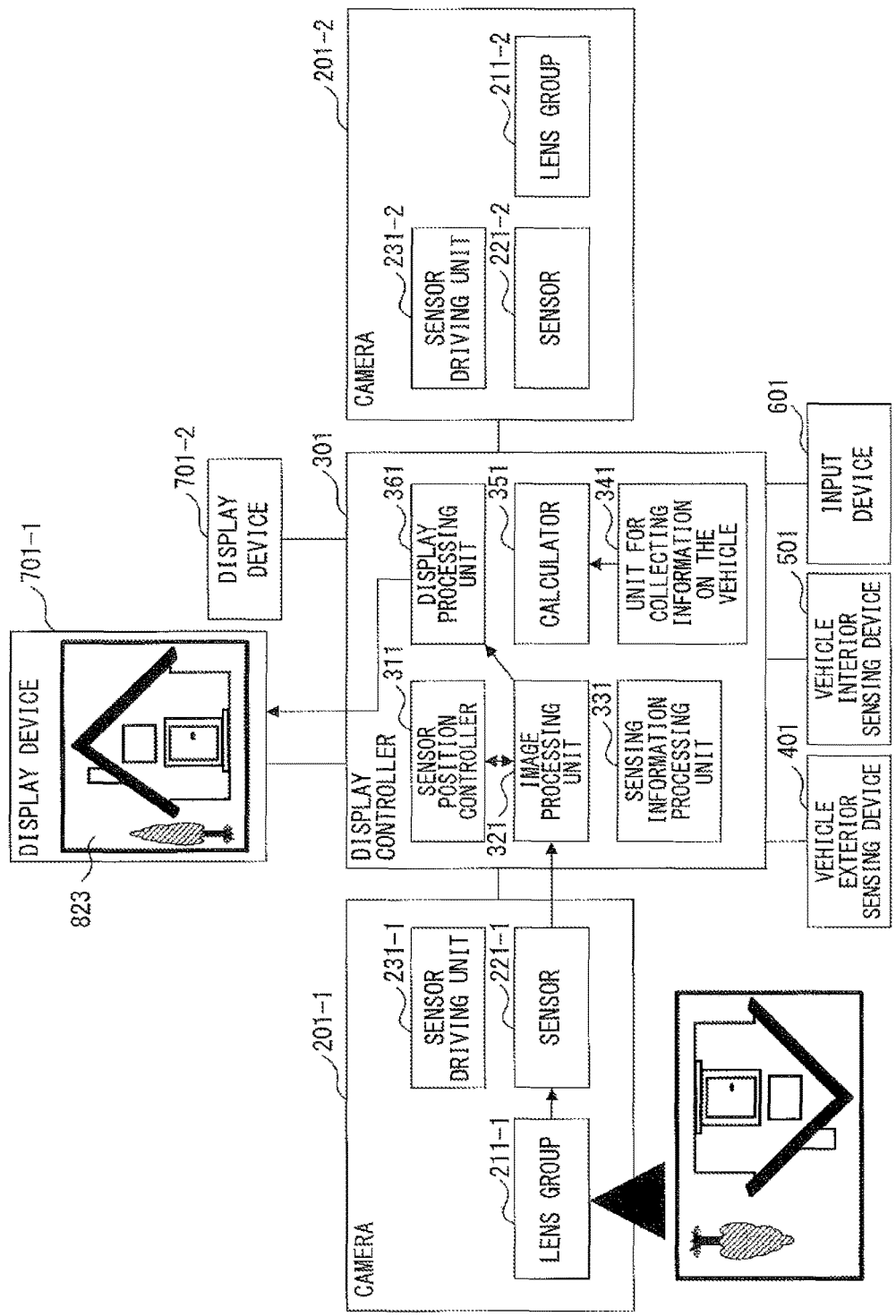
FIG. 22 illustrates a flow of image processing performed on a captured image and processing of displaying the processed captured image on the display device.

FIG. 22 illustrates a flow of image processing performed on a captured image and processing of displaying the processed captured image on the display device.

In FIG. 22, the case of correcting an image captured by the camera 201-1 and displaying the corrected image on the display device 701-1 is described.

Light from an image-capturing range is input to the sensor 221-1 via the lens group 211-1. The sensor 221-1 converts the input light into an electric signal so as to generate a captured image. The sensor 221-1 outputs the captured image to the image processing unit 321.

The image processing unit 321 obtains position information on the sensor 221-1 upon capturing the captured image from the sensor position controller 311. The position information on the sensor 221-1 is, for example, a shift amount of the sensor 221-1.

The image processing unit 321 calculates a corrected area on the basis of the position information on the sensor 221-*i*. For example, the image processing unit 321 stores therein a table in which a corrected area is associated with a shift amount, and calculates the corrected area by referring to the table. Further, the image processing unit 321 may calculate the corrected area by substituting the shift amount into a prescribed expression. The corrected area is increased according to the magnitude of the shift amount.

FIG. 23 illustrates a corrected area in a captured image.

There are a degradation in resolution, a distortion, and the like in the portion of a wide field of view on the right side of the captured image 822 of FIG. 23.

For example, when the shift amount is X mm, the image processing unit 321 calculates Y % of the right side of the captured image 822 as a corrected area. A portion on the right of the dotted line in the captured image 822 is a corrected area.

The image processing unit 321 calculates a correction content and a correction amount on the basis of the position information on the sensor 211-1. For example, the image processing unit 321 stores therein a table in which a shift amount of the sensor 211-*i* is associated with a correction content and a correction amount, and calculates the correction content and the correction amount which correspond to the shift amount of the sensor 221-1 by referring to the table.

The correction content is, for example, an edge enhancement, a distortion correction, a chromatic aberration correction, or the like. The correction amount is, for example, a level of correction performed in correction processing such as an edge enhancement, a distortion correction, a chromatic aberration correction, or the like. For example, the image processing unit 321 makes an enhancement amount (a correction amount) of edge enhancement, a correction amount in distortion correction, or a correction amount in chromatic aberration correction larger if the shift amount is larger.

The image processing unit 321 performs the correction processing on the captured image 822 according to the calculated corrected area, the calculated correction content, and the calculated correction amount, so as to generate a corrected captured image (referred to as a corrected image). The image processing unit 321 transmits the corrected image to the display processing unit 361. The display processing unit 361 receives the corrected image, left-right reverses the corrected image, transmits a left-right reversed corrected image (referred to as the display image 823) to the display device 701-1, and causes the display image 823 to be displayed on the display device 701-1.

FIG. 24 is a flowchart of the image processing according to the embodiments.

In Step S911, the image processing unit 321 receives a captured image from the sensor 221-*i*.

In Step S912, the image processing unit 321 obtains position information on the sensor 221-*i* upon capturing the captured image from the sensor position controller 311. The position information on the sensor 221-1 is, for example, a shift amount of the sensor 221-*i*.

In Step S913, the image processing unit 321 calculates a corrected area on the basis of the position information on the sensor 221-*i*. For example, the image processing unit 321 calculates the corrected area from the shift amount of the sensor 221-*i* using a prescribed conversion expression. Further, the image processing unit 321 may store therein a table in which a shift amount of the sensor 221-*i* is associated with a corrected area, and calculate the corrected area which corresponds to the shift amount of the sensor 221-*i* by referring to the table. The corrected area is increased according to the magnitude of the shift amount of the sensor 221-*i*.

In Step S914, the image processing unit 321 calculates a correction content and a correction amount on the basis of the position information on the sensor 211-*i*. For example, the image processing unit 321 stores therein a table in which a shift amount of the sensor 211-*i* is associated with a correction content and a correction amount, and calculates the correction content and the correction amount which correspond to the shift amount of the sensor 221-*i* by referring to the table.

In Step S915, the image processing unit 321 performs the image processing on the captured image according to the calculated corrected area, the calculated correction content, and the calculated correction amount, so as to generate a corrected captured image (a corrected image).

In Step S916, the image processing unit 321 transmits the corrected image to the display processing unit 361. The display processing unit 361 receives the corrected image, left-right reverses the corrected image, transmits a reversed corrected image (a display image) to the display device 701-*i*, and causes the display image to be displayed on the display device 701-*i*. When the received corrected image is an image obtained by correcting a captured image captured by the camera 221-1, the display processing unit 361 transmits the display image to the display device 701-1. When the received corrected image is an image obtained by correcting a captured, image captured by the camera 221-2, the display processing unit 361 transmits the display image to the display device 701-2. The display device 701-*i* displays the received display image.

The system 101 according to the embodiments makes it possible to make an optical system smaller while realizing a wide field of view because it does not use a mirror member of Patent Document 1 for obtaining a wide field of view. This results in being able to make the size of a camera smaller, reduce an air resistance while a vehicle is traveling, and improve fuel economy.

The system 101 according to the embodiments realizes a wide field of view by moving a sensor, so it is possible to reduce a display delay, compared to the case of realizing a wide field of view by performing image processing.

FIG. 25 illustrates a configuration of an information processing device (a computer).

The system 101 and the display controller 301 according to the embodiments can be realized by, for example, an information processing device (a computer) 1 as illustrated in FIG. 25. Further, the sensor position controller 311, the image processing unit 321, the sensing information processing unit 331, the unit 341 for collecting information on the vehicle, the calculator 351, the display processing unit 361, or any combination of thereof can be realized by the information processing device 1. The information processing device 1 is, for example, an electronic control unit (ECU).

The information processing device 1 includes a CPU 2, a memory 3, an input device 4, an output device 5, a storage 6, a recording medium driving device 7, and a network connecting device 8, and these components are connected to one another via a bus 9.

The CPU 2 is a central processing unit that controls the entirety of the information processing device 1. The CPU 2 operates as the sensor position controller 311, the image processing unit 321, the sensing information processing unit 331, the unit 341 for collecting information on the vehicle, the calculator 351, and the display processing unit 361.

The memory 3 is a memory such as a read only memory (ROM) and a random access memory (RAM) which temporarily stores, upon executing a program, the program or data that is stored in the storage 6 (or a portable recording medium 10). The CPU 2 executes the program using the memory 3, so as to perform the variety of processes described above.

In this case, a program code itself that is read from, for example, the portable recording medium 10 realizes the functions of the embodiments.

The input device 4 is used, for example, for inputting instructions or information from a driver or obtaining data used in the information processing device 1. The input device 4 is, for example, a keyboard, a mouse, a touch panel, a camera, a sonar, a radar, a line-of-sight sensor, or a sensor that detects a state of a vehicle. The input device 4 corresponds to the vehicle exterior sensing device 401, the vehicle interior sensing device 501, or the input device 601.

The output device 5 is a device that outputs inquiries to the driver or outputs a result of processing and that operates by a control performed by the CPU 2. The output device 5 is, for example, a display. The output device corresponds to the display 701-*i*.

The storage 6 is, for example, a magnetic disk device or a solid state drive (SSB). The information processing device 1 stores the above-described program and data in the storage 6 so as to load them into the memory 3 and use them.

The recording medium driving device 7 drives the portable recording medium 10 so as to access the recorded content. Any computer-readable recording medium such as a memory card, a flexible disk, a compact disk read only memory (CD-ROM), an optical disc, or a magneto-optical disk may be used as a portable recording medium. A user stores the above-described program and data in the portable recording medium 10 so as to load them into the memory 3 and use them.

The network connecting device 8 is a communication interface that is connected to a network and makes a data conversion associated with communication. The network connecting device 8 transmits/receives data to/from a device that is connected to the network connecting device 8 through the network.

The information processing device 1 does not necessarily include all the components in FIG. 25, and some of the components can be omitted according to the applications or the requirements. For example, when the instructions or the information from the driver are not to foe input, the input device 4 may be omitted. The input device 4 may be removable from the information processing device 1. When the information processing device 1 does not access the portable recording medium 10, the recording medium driving device 7 may be omitted. The information processing device 1 is not connected to the network, the network connecting device 8 may be omitted.

All examples and conditional language provided herein are intended for pedagogical purposes to aiding the reader in understanding the invention and the concepts contributed by the inventor to further the art, and are not to foe construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display controller that controls a camera capturing an image of an area diagonally behind a vehicle and including an imaging element that receives light from an image-capturing target through an optical system, the display controller comprising:
   a processor that calculates a shift amount of a reference position of the imaging element with respect to an optical axis of the optical system, performs a control to move the reference position of the imaging element in a direction away from the optical axis according to the shift amount, corrects an image captured by the camera, and generates a display image based on the image captured by the camera so as to cause the display image to be displayed on a display device,
   wherein the processor calculates, based on the shift amount, a range of correction processing to be conducted on the image captured by the camera, the range of the correction processing increases according to the shift amount.

2. The display controller according to claim 1, wherein the reference position is the center of the imaging element, and the processor moves the imaging element in a direction in which the center of the imaging element moves away from the optical axis.

3. The display controller according to claim 1, wherein the processor calculates the shift amount of the imaging element on a basis of information on a vehicle exterior sensor that detects a state outside the vehicle.

4. The display controller according to claim 1, wherein the processor calculates the shift amount of the imaging element on a basis of a traveling state of the vehicle.

5. The display controller according to claim 1, wherein the processor calculates the shift amount of the imaging element on a basis of information on a vehicle interior sensor that detects a state of a driver of the vehicle.

6. A display control method for controlling a display controller that controls a camera capturing an image of an area diagonally behind a vehicle and including an imaging element that receives light from an image-capturing target through an optical system, the display control method comprising:
   calculating a shift amount of a reference position of the imaging element with respect to an optical axis of the optical system;
   performing a control to move the reference position of the imaging element in a direction away from the optical axis according to the shift amount;
   performing a correction processing on an image captured by the camera; and
   generating a display image based on the image captured by the camera so as to cause the display image to be displayed on a display device,
   wherein a range of the correction processing to be conducted on the image captured by the camera is calculated based on the shift amount, and the range of the correction processing increases according to the shift amount.

7. The display control method according to claim 6, wherein
   the reference position is the center of the imaging element, and the performing the control to move the reference position of the imaging element moves the imaging element in a direction in which the center of the imaging element moves away from the optical axis.

8. The display control method according to claim 6, wherein
   the calculating the shift amount of the reference position of the imaging element calculates the shift amount of the imaging element on a basis of information on a vehicle exterior sensor that detects a state outside the vehicle.

9. The display control method according to claim 6, wherein
   the calculating the shift amount of the reference position of the imaging element calculates the shift amount of the imaging element on a basis of a traveling state of the vehicle.

10. The display control method according to claim 6, wherein
    the calculating the shift amount of the reference position of the imaging element calculates the shift amount of the imaging element on a basis of information on a vehicle interior sensor that detects a state of a driver of the vehicle.

11. A non-transitory recording medium having stored therein a program that causes a computer to execute a process, the computer controlling a camera capturing an image of an area diagonally behind a vehicle and including an imaging element that receives light from an image-capturing target through an optical system, the process comprising:

calculating a shift amount of a reference position of the imaging element with respect to an optical axis of the optical system;

performing a control to move the reference position of the imaging element in a direction away from the optical axis according to the shift amount;

performing a correction processing on an image captured by the camera; and generating a display image based on the image captured by the camera so as to cause the display image to be displayed on a display device, wherein a range of the correction processing to be conducted on the image captured by the camera is calculated based on the shift amount, and the range of the correction processing increases according to the shift amount.

12. The non-transitory recording medium according to claim 11, wherein the reference position is the center of the imaging element, and the performing the control to move the reference position of the imaging element moves the imaging element in a direction in which the center of the imaging element moves away from the optical axis.

13. The non-transitory recording medium according to claim 11, wherein the calculating the shift amount of the reference position of the imaging element calculates the shift amount of the imaging element on a basis of information on a vehicle exterior sensor that detects a state outside the vehicle.

14. The non-transitory recording medium according to claim 11, wherein the calculating the shift amount of the reference position of the imaging element calculates the shift amount of the imaging element on a basis of a traveling state of the vehicle.

15. The non-transitory recording medium according to claim 11, wherein the calculating the shift amount of the reference position of the imaging element calculates the shift amount of the imaging element on a basis of information on a vehicle interior sensor that detects a state of a driver of the vehicle.

* * * * *